(12) United States Patent
Ookawa et al.

(10) Patent No.: US 6,870,674 B2
(45) Date of Patent: *Mar. 22, 2005

(54) LENS SHEET AND METHOD OF MANUFACTURING THE SAME

(75) Inventors: Makoto Ookawa, Aichi (JP); Masao Hamada, Kanagawa (JP); Akira Motonaga, Kanagawa (JP); Yukichi Konami, Aichi (JP); Akiyoshi Kogame, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 55 days.

This patent is subject to a terminal disclaimer.

(21) Appl. No.: 10/400,644

(22) Filed: Mar. 28, 2003

(65) Prior Publication Data

US 2004/0075897 A1 Apr. 22, 2004

Related U.S. Application Data

(62) Division of application No. 09/762,165, filed as application No. PCT/JP99/04204 on Aug. 4, 1999, now Pat. No. 6,628,460.

(30) Foreign Application Priority Data

Aug. 5, 1998 (JP) .......................................... 10-222075
Feb. 25, 1999 (JP) ............................................ 11-48242

(51) Int. Cl.⁷ ....................... G03B 21/60; G03B 21/56; G02B 27/10
(52) U.S. Cl. ...................... 359/455; 359/454; 359/459; 359/460; 359/619
(58) Field of Search ................................ 359/455, 443, 359/454, 459–460, 619

(56) References Cited

U.S. PATENT DOCUMENTS 5,592,332 A    1/1997   Nishio et al. ................ 359/619
5,831,774 A  * 11/1998   Toshima et al. ............ 359/707

(List continued on next page.)

FOREIGN PATENT DOCUMENTS

EP    0 735 062 A1      2/1996    ......... C08F/220/12
EP    0 952 466 A2  * 10/1999    ............ G02B/1/04

(List continued on next page.)

Primary Examiner—Judy Nguyen
Assistant Examiner—Magda Cruz
(74) Attorney, Agent, or Firm—Morgan Lewis & Bockius LLP

(57) ABSTRACT

In a lens sheet, a lens portion (3) made of activation energy curing resin such as ultraviolet curing resin has a plurality of lens units, the lens portion (3) is disposed on at least one side of a transparent substrate (2) such as plastic sheet, a relaxation layer (1) is disposed between the transparent substrate (2) and the lens portion (3), and the thickness of the relaxation layer (1) is within a range of 1% to 30% of the height (H) of the lens units. The relaxation layer (1) is made of activation energy curing resin and formed integrally with the lens portion (3). The refractive index of the transparent substrate (2) is lower than that of the lens portion (3). The lens units are elongated prisms each having a substantially triangular cross section. The thickness of the relaxation layer is within a range of 1 μm to 10 μm, for example. The prisms have the vertical angle of 50° to 75° and are arranged with a pitch of 10 μm to 150 μm. The lens sheet having the relaxation layer (1) is obtained by providing activation energy curing composition to an area between a lens portion transferring pattern surface of a lens forming mold and one side of the transparent substrate to form a composition layer between the lens forming mold and the transparent substrate, and making the thickness of the composition layer uniform with use of a nip roll disposed so as to confront the other side of said transparent substrate while nip pressure of the nip roll is regulated by pressure regulating means. Due to the relaxation layer (1), the deformation of the surface of the lens portion caused by polymerization shrinkage of the activation energy curing composition is suppressed so as to prevent occurrence of the optical defect in the lens sheet such as spot pattern, glare, etc.

14 Claims, 10 Drawing Sheets

U.S. PATENT DOCUMENTS

| | | | |
|---|---|---|---|
| 5,844,720 A | 12/1998 | Ohara et al. | 359/599 |
| 5,969,867 A | 10/1999 | Fukushima et al. | 359/581 |
| 6,046,855 A | 4/2000 | Goto | 359/619 |
| 6,130,777 A | 10/2000 | Yamashita et al. | 359/456 |
| 6,206,550 B1 | 3/2001 | Fukushima et al. | 362/335 |
| 6,421,174 B1 | 7/2002 | Ooshima et al. | 359/457 |
| 6,570,710 B1 * | 5/2003 | Nilsen et al. | 359/625 |
| 6,628,460 B1 * | 9/2003 | Ookawa et al. | 359/455 |

FOREIGN PATENT DOCUMENTS

| | | | |
|---|---|---|---|
| JP | 61-254941 | 11/1986 | G03B/21/62 |
| JP | 1-192529 | 8/1989 | B29D/11/00 |
| JP | 3-122601 | 5/1991 | G02B/3/08 |
| JP | 4-329501 | 11/1992 | G02B/1/04 |
| JP | 7-198913 | 8/1995 | G02B/5/02 |
| JP | 10-158349 | 6/1998 | C08F/290/06 |

* cited by examiner

LENS SHEET AND METHOD OF MANUFACTURING THE SAME

This application is a division of application Ser. No. 09/762,165, filed Feb. 5, 2001, now U.S. Pat. No. 6,628,460, which is a 371 of PCT/JP99/04204, filed Aug. 4, 1999.

FIELD OF THE INVENTION

The present invention relates to a lens sheet such as a prism sheet used for enhancing luminance in normal direction in a back light system, etc. as an illuminating planar light source device of liquid crystal display apparatus, etc., or a double-sided lenticular lens sheet used in a projection screen as a display panel of projection television, microfilm reader, etc., and a method of manufacturing the same, and particularly to a lens sheet having no optical defect such as spot pattern, glare or the like and a method of manufacturing such a lens sheet.

DESCRIPTION OF THE RELATED ART

Recently, in an article which is driven by battery, such as portable personal computer having color liquid cryatal display apparatus, portable liquid crystal display apparatus and video-integrated liquid crystal display television, etc. having color liquid crystal display panel, or the like, it has been an obstacle to the prolongation of operation time duration by a charged battery that the power consumption of the liquid crystal display apparatus is significant. Especially, a rate of the power consumption of the backlight system used in the liquid crystal display apparatus to the total power consumption of the liquid crystal display apparatus is great. Therefore, in order to prolong the operation time duration by the charged battery so as to enhance the utilization of the article, it is important to reduce the power consumption of the backlight system as much as possible. However, it is not preferable to lower the luminance of the backlight system by suppressing the power consumption of the backlight system, because it becomes hard to observe the liquid crystal display. In JP-3-69184(U), etc., there is disclosed a backlight system provided with a lens sheet having a plurality of lens units such as elongated prisms on the surface thereof and disposed at the light emitting side of the light guide to thereby improve optical efficiency, so that the power consumption of the backlight system is reduced without lowering the luminance.

As the lens sheet mentioned in the above, there is proposed a lens sheet having the lens portion made of activation energy curing composition such as ultraviolet curing composition which has good transferring property and good yieldability. In such a lens sheet, for example, the lens portion of cured activation energy curing composition is integrally formed with a transparent substrate such as transparent resin film or transparent resin sheet.

In such a lens sheet having the lens portion which is made of activation energy curing resin, there is the following problem: In case where the lens sheet is used as a component of the backlight system, a spot pattern which is considered to be performed on the basis of the deformation of the lens shape caused by the shrinkage of the activation energy curing resin in polymerization when the activation energy curing resin is cured and molded. The spot pattern becomes an optical defect to deteriorate the optical property of the backlight system.

On the other hand, in the projection screen of a projection television, microfilm reader, etc., there is used a lenticular lens sheet having lenticular lenses formed on both sides in order to form a good projection image. Conventionally, such a lenticular lens sheet has been manufactured by injection molding method in which transparent resin material is used, or press molding method in which a lens mold having a lenticular lens transferring pattern is pressed to the resin plate under heating to thereby transfer the pattern onto the surface of the resin plate. The transparent resin material is, for example, acrylic resin, polycarbonate resin, vinyl chroride resin, styrene resin, etc.

However, in case of the injection molding method, it is difficult to manufacture a lenticular lens sheet of large size, and therefore this method is restricted to obtain the lens sheet of relatively small size. In case of the press molding method, since a long time is required for heating/cooling cycle of the resin plate and lens forming mold, many lens forming molds are necessary for mass production of the lens sheet, and therefore enormous expense is necessitated for providing the manufacturing apparatuses in manufacturing the lenticular lens sheet of large size.

There has been proposed a manufacturing method of the lens sheet in which an activation energy curing composition is poured into the plate-shaped lens forming mold, then irradiated with the activation energy to cure the composition to perform the forming. This method makes it possible to reduce the forming time to thereby enhance the yieldability. However, there is a problem in the method that bubbles are involved in the resin when pouring the resin into the lens forming mold. In order to avoid such a problem, it is necessary to perform the deaeration in the additional step, or to pour the resin into the mold slowly. Therefore, it is insufficient to take the above conventional method for mass production. Especially, in the method where the lens forming mold having specific transferring pattern is used, the air tends to be retained in the groove of the mold, thereby occurring the air bubbles in the resulting lens sheet. The air bubbles formed once is not easily removed and causes a generation of defect of air bubble in the lens.

In order to prevent such a bubble generation, there is proposed in JP-1-192529(A) a method in which the ultraviolet curing composition is supplied on the lens forming mold so as to form a composition pool, a base film is put on the pool, the pool is averaged in height by pressing with roller on the lens forming mold via the base film to fix the base film to the composition, then the composition is irradiated with the ultraviolet light to perform the curing and molding of the composition, and then the mold is removed to obtain the lens sheet.

However, according to such a method, it is difficult to obtain a lens sheet having uniform thickness, and thus the lens sheet tends to have lower uniformity in thickness, resuting in the problem of causing the deterioration of the lens performance such as distortion of the image, etc. Additionally, in this method, since the shrinkage of the activation energy curing composition in polymerization is considerable when curing, the lens shape is not sufficiently transferred so that the lens sheet obtained is deviated considerably from the shape designed, or the strain remains in the lens sheet. A gap tends to occur between the lens portion and the transparent substrate of sheet to cause delamination. Especially in the double-sided lenticular lens sheet, the lower uniformity in thickness and lower coincidence in the optical axes of lenticular lenses at both sides deteriorate the screen performance, and therefore it is necessary to control the thickness of lens and lens coincidence at both sides.

Recently, it has been required super fine image displaying, and in order to comply with such a requirement, there is proposed a method of continuously forming a lenticular lens made of ultraviolet curing resin on both sides of the transparent substrate with use of the cylindrical lens-forming mold in JP-1-159627(A) or JP-3-64701(A).

In case of such a method where the double-sided lenticular lens sheet is manufactured with use of the ultraviolet curing composition, lens shape is slightly deformed on the basis of the polymerization shrinkage of the ultraviolet curing composition when the ultraviolet composition is polymerized and cured. Therefore, in a screen provided with the double-sided lenticular lens thus obtained, there occurs a glare which is considered to be caused by lower uniformity in direction of the reflected light of the external light. The glare is one of the optical defects which deteriorate the optical performance of the screen, etc.

SUMMARY OF THE INVENTION

Therefore, an object of the present invention is to provide a lens sheet having no optical defect such as spot pattern, glare or the like and a method of manufacturing such a lens sheet by suppressing ocurrig of deformation of the lens shape caused by polymerization shrinkage of the activation energy curing composition.

A lens sheet according to the present invention comprises a transparent substrate; a lens portion made of activation energy curing resin having a plurality of lens units, the lens portion being disposed on at least one side of the transparent substrate; and a relaxation layer disposed between the transparent substrate and the lens portion, wherein a thickness of the relaxation layer is within a range of 1% to 30% of a height of the lens units.

A method of manufacturing a lens sheet according to the present invention comprises the steps of:

providing an activation energy curing composition to an area between a lens portion transferring pattern surface of a lens forming mold and one side (inner surface) of a transparent substrate to form a composition layer between the lens forming mold and the transparent substrate;

making a thickness of the composition layer uniform with use of a nip roll disposed so as to confront the other side (outer surface) of the transparent substrate;

irradiating the composition layer with activation energy via the transparent substrate to cure the composition layer and form a lens portion made of activation energy curing resin; and releasing the lens portion and the transparent substrate as an integrated form from the mold, wherein a relaxation layer made of activation energy curing resin is formed between the lens portion and the transparent substrate on the basis that nip pressure of the nip roll is regulated by pressure regulating means.

According to the present invention, since the thickness of the activation energy curing resin composition layer is made uniform with use of the nip roll under regulated nip pressure by pressure regulating means while the lens portion is formed via the relaxation layer having a specific thickness, so that the deformation of shape of the lens portion caused by the polymerization shrinkage of the activation energy curing resin composition is moderated by the relaxation layer formed simultaneously, there is provided a lens sheet such as prism sheet or double-sided lenticular lens sheet, etc. having no optical defect such as spot pattern, glare or the like.

DETAILED DESCRIPTION OF THE INVENTION

First, a lens sheet according to the present invention will be described with reference to FIGS. 1 to 3.

Figure 1:
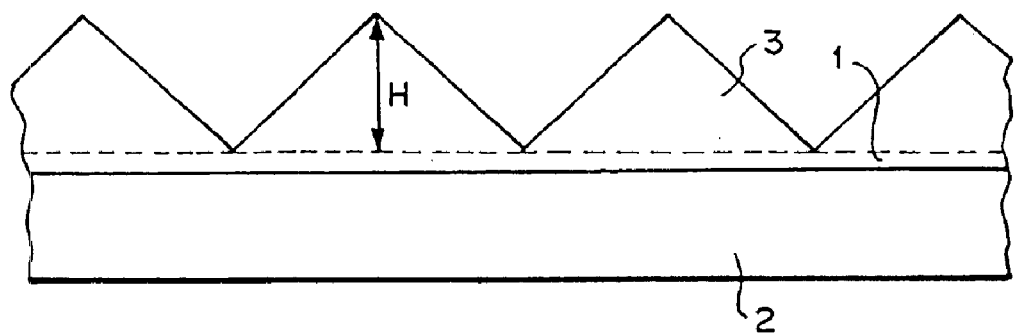
FIG. 1 is a schematic cross-sectional view showing a single-sided prism sheet according to the present invention.

FIG. 1 shows a prism sheet for use in enhancing luminance in normal direction of a planar light source device such as a backlight system, etc. of liquid crystal display apparatus in a portable personal computer having a color liquid cryatal display device, portable liquid crystal display television having a color liquid crystal panel, video-integrated liquid crystal television, etc. The prism sheet corresponds to the lens sheet according to the present invention. As shown in FIG. 1, in the prism sheet, a lens portion 3 made of activation energy curing resin which is constituted by a plurality of lens units (elongated prisms) is disposed on one surface (side) of a transparent substrate 2, and a relaxation layer 1 is interposed between the transparent substrate 2 and the lens portion 3. FIG. 2 shows a double-sided prism sheet which has another lens portion 4 made of activation energy curing resin which is constituted by a plurality of lens units disposed on the other surface (side) of the transparent substrate 2 of the prism sheet of FIG. 1. As shown in FIG. 2, another relaxation layer 1' is interposed between the transparent substrate 2 and the lens portion 4.

The relaxation layers 1, 1' are typically formed with the same activation energy curing resin as the lens portion 3, 4 so as to be integrated with the lens portion 3, 4, respectively. When the relaxation layers 1, 1' have the thickness of 1% to 30% of the height (H, H') of the lens units of the lens portions 3, 4 respectively, the spot pattern caused by shrinkage of activation energy curing composition during polymerization can be suppressed.

In the present invention, shape of the surface of the lens portions 3, 4 of the lens sheet are set so as to achieve the object. For example, instead of the prism surface in which a plurality of elongated prisms extend in parallel to each other as shown in FIGS. 1 and 2, it may be a Fresnel lens surface in which a linear Fresnel lens or circular Fresnel lens is formed, a lenticular lens surface in which a plurality of lenticular lenses each having a cross section of hemi-circular shape, hemi-elliptical shape, or the like extend in parallel to each other, or wavy pattern lens surface. In the lens portions 3, 4, lens shapes of the same type or same size may be formed on both sides of the transparent substrate 2, or lens shapes of different type or different size may be formed on each side of the transparent substrate 2. In the lens sheet of the present invention, the thickness of the lens portions 3, 4 is preferably within the range of about 10 $\mu$m to 150 $\mu$m. The pitch of lens units is preferably within the range of about 10 $\mu$m to 150 $\mu$m. Especially, the lens sheet having the lens portion made of activation energy curing resin is suitable for a lens sheet having fine pitch lens units for use in the planar light source device capable of achieving super fine picture element of liquid crystal display device, etc. The pitch of lens units is more preferably within the range of about 10 $\mu$m to 100 $\mu$m, especially about 10 $\mu$m to 50 $\mu$m.

When the lens unit is elongated prism, the vertical angle of the prism is preferably 50° to 160°. In the edge lighting type planar light source device having a light source; a light guide which has a light incident face on one side end surface thereof which confronts the light source, and a light emitting face on one surface thereof which is substantially perpendicular to the light incident face; and the prism sheet disposed on the light emitting face of the light guide, the vertical angle of the prism is preferably within the range of 80° to 100°, more preferably 85° to 95° in case that the prism surface of the prism sheet confronts the liquid crystal panel. On the other hand, in case that the prism surface of the prism sheet confronts the light guide, the vertical angle of the prism is preferably within the range of 50° to 75°, more preferably 55° to 70°. The refractive index of lens portions 3, 4 made of activation energy curing resin is preferably high, for example 1.55 or more, preferably 1.6 or more, in view of enhancing the luminance of the planar light source device.

Figure 3A:
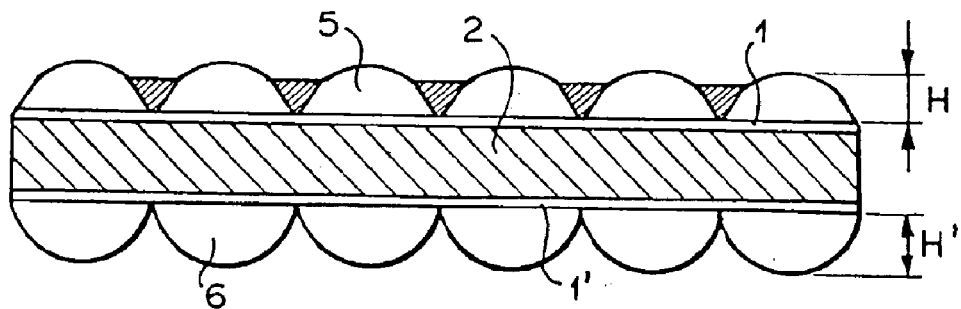
FIGS. 3A and 3B are a schematic cross-sectional view showing a double-sided lenticular lens sheet according to the present invention for use in a projection screen.
Figure 3B:
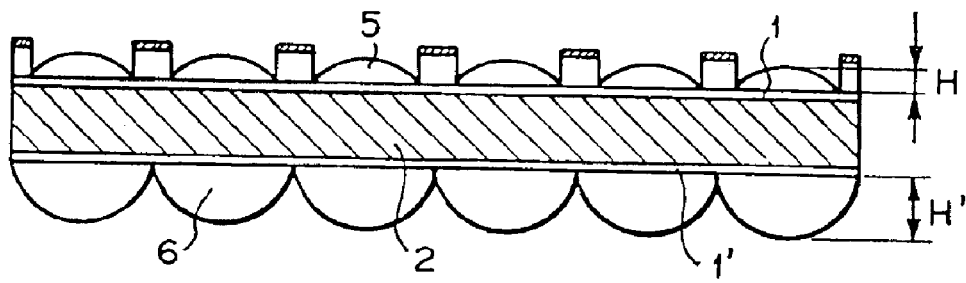

FIGS. 3A and 3B show a double-sided lenticular lens sheet having lenticular lenses at both sides for use in the projection screen of projection television, microfilm reader, or the like. FIGS. 3A and 3B are different from each other in the shape of lenticular lens at the light emitting side. In FIG. 3A, a light absorbing layer is disposed at a valley portion between adjacent lenticular lens units at the light emitting side (upper side in FIG. 3A). In FIG. 3B, a protrusion is disposed between adjacent lenticular lens units at the light emitting side, and a light absorbing layer is disposed on the protrusion.

In the double-sided lenticular lens sheet of the present invention, as shown in FIGS. 3A and 3B, a first lens portion 5 (light emitting side lenticular lens portion) made of activation energy curing resin having a plurality of first lenticular lens units is formed on one side of the transparent substrate 2, a second lens portion 6 (light incident side lenticular lens portion) made of activation energy curing resin having a plurality of second lenticular lens units is formed on the other side of the transparent substrate 2, and the relaxation layers 1, 1' are disposed between the transparent substrate 2 and the first and second lens portions 5, 6 respectively. The relaxation layers 1, 1' are typically made of the same activation energy curing resin as the lens portions 5, 6 respectively and formed integrally with the lens portions 5, 6 respectively. When the relaxation layers 1, 1' have the thickness of 1% to 30% of the height (H, H') of the lens units, the glare caused by shrinkage of activation energy curing composition during polymerization can be suppressed.

In the double-sided lenticular lens sheet of the present invention, the thickness of the lens portions 5, 6 is preferably within the range of about 50 $\mu$m to 1000 $\mu$m. The pitch of lens units is preferably within the range of about 50 $\mu$m to 1000 $\mu$m. Especially, the lenticular lens sheet having the lens portion made of activation energy curing resin is suitable for a double-sided lenticular lens sheet having fine pitch lenticular lenses. The pitch of lens units is more preferably within the range of about 50 $\mu$m to 500 $\mu$m, especially about 50 $\mu$m to 450 $\mu$m.

In the lens sheet of the present invention, it is necessary to set the thickness of the relaxation layers 1, 1' to 1% to 30% of the height of the lens units as mentioned in the above. The height of the lens units. means the height (H, H') of the lens portions 3 to 6. That is, when the relaxation layers 1, 1' are made of the activation energy curing resin and formed integrally with the lens portions, the height corresponds to a thickness value obtained by subtracting the thickness value of the relaxation layers 1, 1' from a thickness value of the activation energy curing resin layer. The relaxation layers 1, 1' function to moderate the deformation of lens shape (shape of surface of the lens portion) by supplying resin poverty in the lens forming mold caused by shrinkage of the activation energy curing resin when the lens portions 3 to 6 are formed. In case of the thickness of the relaxation layers 1, 1' of less than 1% of the height of lens units, the above moderating effect tends to become insufficient. On the other hand, in case of the thickness of the relaxation layers 1, 1' of more than 30% of the height of lens units, uniformity in the thickness of the relaxation layers 1, 1' tends to be lowered so that the optical property of the lens sheet is deteriorated. The thickness of the relaxation layers 1, 1' is preferably within a range of 1% to 25%, more preferably 3% to 15%, of the height of lens units. In the prism sheet having the lens units of fine pitch or thickness of several tens micrometers for use in the planar light source device used for the liquid crystal display apparatus as shown in FIGS. 1 and 2, the thickness of the relaxation layers 1, 1' is preferably thinner, for example within a range of 1 μm to 10 μm, preferably 1 μm to 5 μm. On the other hand, in the double-sided lenticular lens sheet shown in FIGS. 3A and 3B, the thickness of the relaxation layers 1, 1' is preferably within a range of 5 μm to 30 μm, preferably 5 μm to 15 μm.

Material of the transparent substrate 2 of the lens sheet according to the present invention is not restricted to specific one provided that it transmits the activation energy such as ultraviolet light, electron beam or the like. A resilient glass plate may be used, however, a sheet or film made of transparent resin such as polyester resin, acrylic resin, polycarbonate resin, vinyl chloride resin, polymethacrylimide resin, etc. Especially, it is preferable to use the transparent substrate 2 made of polymethylmethacrylate, mixture of polymethylacrylate and polyvinylidene fluoride, polycarbonate resin, polyester resin such as polyethylene terephthalate, etc. The thickness of the transparent substrate 2 which may vary according to the application of the lens sheet is within the range of about 50 μm to 500 μm for example. It is preferable to perform adhesion enhancement treatment on the transparent substrate 2 such as anchor coat treatment.

The activation energy curing resin which is used for the relaxation layers 1, 1' and lens portions 3 to 6 of the lens sheet is not restricted to specific one provided that the resin has been cured by irradiating with the activation energy such as ultraviolet light, electron beam, etc. For example, polyester resin, epoxy resin, (meth)acrylate resin such as polyester(meth)acrylate, epoxy(meth)acrylate, urethane (meth)acrylate, etc. can be used. Of these, (meth)acrylate resin is preferable in view of the optical property. Preferable example of the activation energy curing composition for the above-mentioned curing resin is composition including polyacrylate and/or polymethacrylate (hereunder referred to as "poly(meth)acrylate"), monoacrylate and/or monomethacrylate (hereunder referred to as "mono(meth) acrylate") and photopolymerization initiator for activation energy as major ingredients. Typical examples of the poly (meth)acrylate are polyol poly(meth)acrylate, polyester poly (meth)acrylate, epoxy poly(meth)acrylate, urethane poly (meth)acrylate, etc. These are used alone or in combination. Typical examples of the mono(meth)acrylate are mono (meth)acrylic ester of monoalcohol, mono(meth)acrylic ester of polyol, etc., however, in case of the latter used in combination with metallic lens forming mold, it is preferable to use it at a smaller amount in order to reduce the mold release difficulty which is considered to be caused by free hydroxyl groups. Also, in case of (meth)acrylic acid and metallic salt thereof used in combination with the metallic mold, it is preferable to use them at a smaller amount because they have high polarity.

Next, a method of manufacturing a lens sheet according to the present invention will be described with reference to the drawings.

Figure 4:
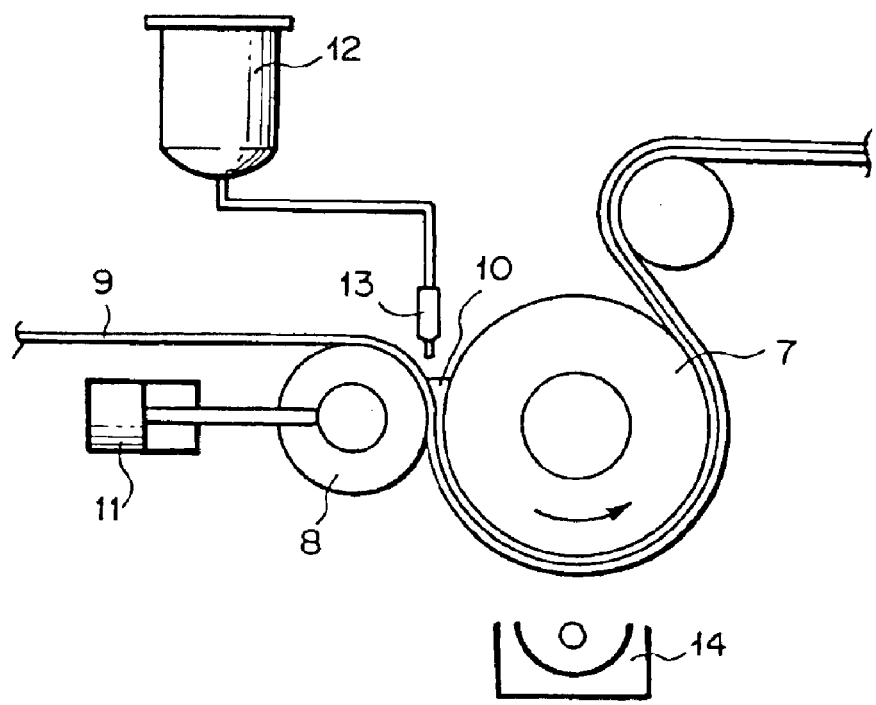
FIG. 4 is a schematic diagram showing a process of manufacturing a lens sheet according to the present invention.
Figure 5:
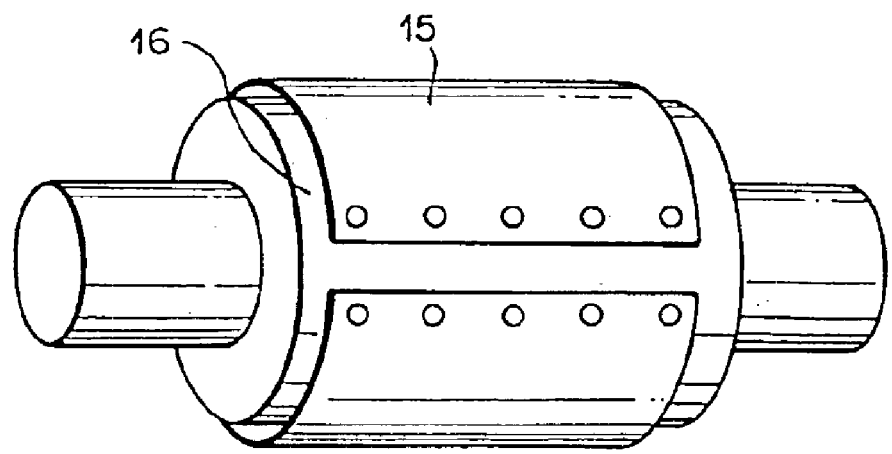
FIG. 5 shows a cylindrical lens-forming mold used in a process of manufacturing a lens sheet according to the present invention.
Figure 6:
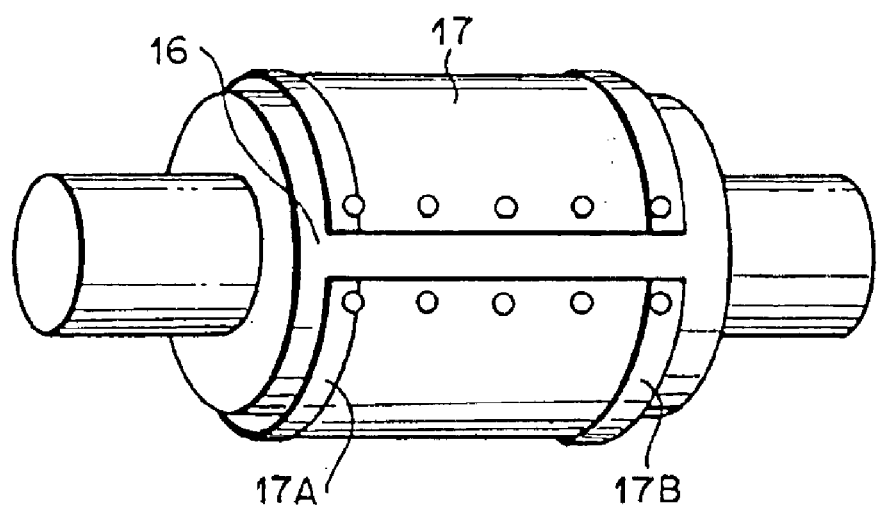
FIG. 6 shows a cylindrical lens-forming mold used in a process of manufacturing a lens sheet according to the-present invention.

FIGS. 4 to 6 are each a schematic diagram showing a process of manufacturing a prism sheet (lens sheet) shown in FIG. 1 according to the present invention. Especially, FIG. 4 shows a manufacturing steps of the lens sheet, and FIGS. 5 and 6 show the cylindrical lens-forming mold (roll-shaped mold) used in the manufacturing step. In these figures, reference numeral 7 denotes a lens forming mold having a lens portion transferring pattern on the outer peripheral surface thereof which is composed of a plurality of lens unit transferring portions corresponding to the plurality of lens units of the lens sheet to be manufactured. The mold may be a metallic mold made of aluminum, brass, steel, etc., plastic mold made of synthetic resin such as silicone resin, polyurethane resin, epoxy resin, ABS resin, fluoroplastic, polymethylpentene resin, etc., or mold manufactured by electroforming method such as Ni electroforming method. In particular, in case of roll-shaped mold shown in FIG. 4, it is preferable to use the metallic mold in view of heat resistance and strength. In the present invention, the mold is not restricted to the roll-shaped mold. Plate-shaped mold may be used. As shown in FIG. 5, in case of the roll-shaped mold, the mold can be obtained by wrapping a thin-plate lens forming mold 15 having the lens portion transferring surface round a cylindrical roll 16 to fix the former to the latter. In order to make the relaxation layer 1 uniform, it is preferable to use a cylindrical mold as shown in FIG. 6, in which a thin-plate lens forming mold 17 having step portions 17A, 17B at a neighborhood of both ends thereof is wrapped round a cylindrical roll 16 to fix the former to the latter, so that the step portions 17A, 17B extend in a circumferential direction of the mold while the step portions 17A, 17B are higher than the other portion with respect to radial direction of the mold. It is preferable to coat the surface of the mold with copper or nickel plated layer for preventing various kinds of corrosions.

Transparent substrate 9 is fed along the lens portion transferring pattern surface of the lens forming mold 7. Activation energy curing composition 10 is fed continuously to an area between the lens mold 7 and the transparent substrate 9 from the tank 12 through the nozzle 13. A nip roll 8 for making the thickness of the layer of the activation energy curing composition 10 fed uniform is disposed at the outside of the transparent substrate 9 (opposite side to the side of lens forming mold 7). As the nip roll 8, metallic roll, rubber roll, etc. can be used. In order to make the thickness of the layer of the activation energy curing composition 10 uniform, it is preferable to use the nip roll manufactured with high precision in roundness, surface roughness, etc. In case of rubber roll, it preferably has a rubber hardness of 60 degrees or more. It is necesary to make the nip roll 8 in sufficient for regulating the thickness of the activation energy curing composition 10, and therefore the pressure is applied to the nip roll 8 by means of the pressure regulating mechanism 11. As the pressure regulating mechanism 11, hydraulic cylinder, air cylinder, screw adjuster, etc. may be used. Of these, the air cylinder is preferable in view of simplicity of mechanism. Air pressure can be regulated by pressure regulating valve, etc.

Activation energy curing composition 10 fed to the area between the lens forming mold 7 and the transpatent substrate 9 preferably has a predetermined viscosity in order to form the relaxation layer 1 having a constant thickness. The viscosity of the composition may be varied according to the thickness of the relaxation layer 1, however, it is preferably within the range of 20 mPa·S to 3000 mPa·S, more preferably within the range of 100 mPa·S to 1000 mPa·S. If the viscosity of the activation energy curing composition is lower than 20 mPa·S, it is necessary to set the nip pressure very low or increase the forming speed extremely. However, when the nip pressure is set to very low, operation of the pressure regulating mechanism 11 tends to become unstable, resulting in ununiformity of the thickness of the relaxation layer 1. When the forming speed is increased extremely, irradiation amount with the activation energy tends to be reduced, resulting in insufficient curing of the activation energy curing composition 10. On the other hand, if the viscosity of the activation energy curing composition 10 is greater than 3000 mPa·S, the activation energy curing composition 10 tends to be fed insufficiently so that the composition cannot reach the detailed portion of the lens porion transferring pattern of the mold, resulting in the insufficient transferring of the lens shape, occurrence of the defect based on the incorporation of air bubbles into the lens portion, and the lowering of productivity based on the reduction of the forming speed. In order to maintain the viscosity of the activation energy curing composition 10 constant, it is preferable to provide a heat source unit such as sheathed heater, warm water jacket, etc. at the outside or inside of the tank 12.

After the activation energy curing composition 10 is fed to the area between the lens forming mold 7 and the transparent substrate 9, the composition is irradiated with the activation energy from the activation energy source 14 via the transparent substrate 9, while the composition is in a form of layer sandwiched by the lens forming mold 7 and the transparent substrate 9, to polymerize and cure the composition layer, thereby transferring the lens portion transferring pattern of the lens forming mold 7 into the cured composition. As the activation energy irradiating source 14, chemical lamp for use in the chemical reation, low pressure mercury lamp, high pressure mercury lamp, metallic halide lamp, visible light halogen lamp, etc. may be used. Activation energy irradiation is preferably performed so that the integration energy amount of 200 nm to 600 nm wavelength width becomes about 0.1 J/cm$^2$ to 50 J/cm$^2$. Atmosphere in which the activation energy irradiation is performed may be atmosheric air or inert gas such as nitrogen, argon or the like. Then, the lens sheet comprising the transparent substrate 9 and the lens portion made of cured activation energy curing resin integrated with the substrate is released from the lens forming mold 7.

Figure 2:
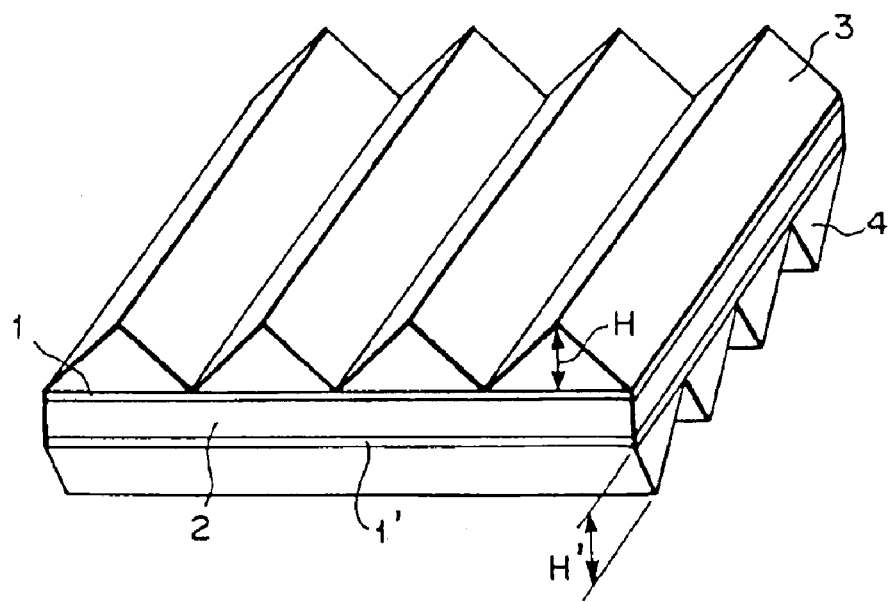
FIG. 2 is a schematic perspective view showing a double-sided prism sheet according to the present invention.
Figure 7:
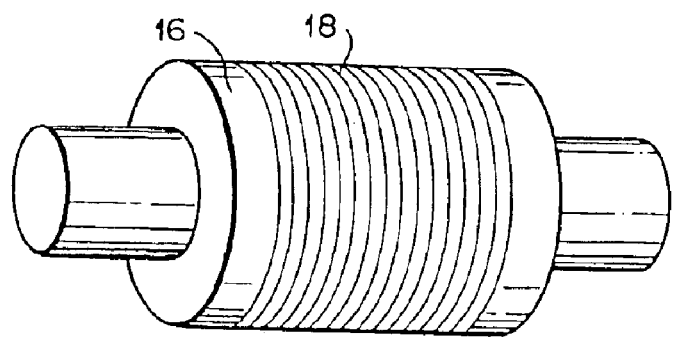
FIG. 7 shows a cylindrical lens-forming mold used in a process of manufacturing a lens sheet according to the present invention.
Figure 8:
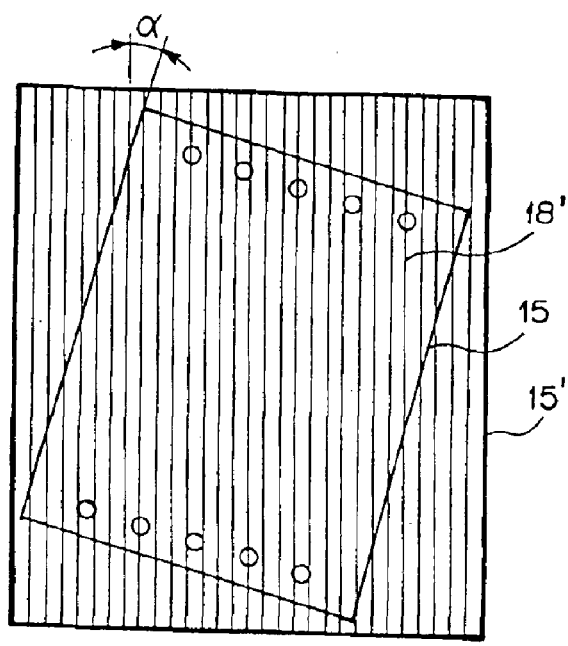
FIG. 8 shows a thin-plate lens forming mold for use in a cylindrical lens forming mold of wrapping type.
Figure 9:
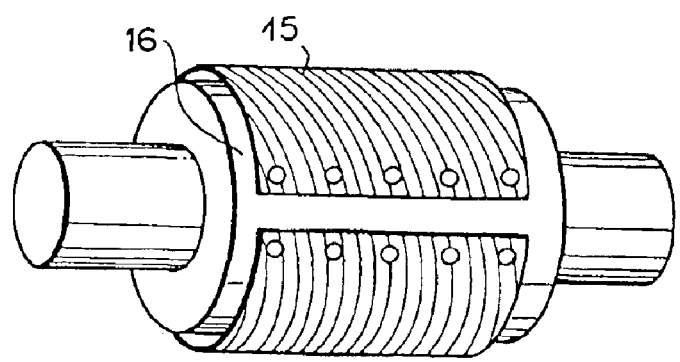
FIG. 9 shows a cylindrical lens-forming mold used in a process of manufacturing a lens sheet according to the present invention.
Figure 10:
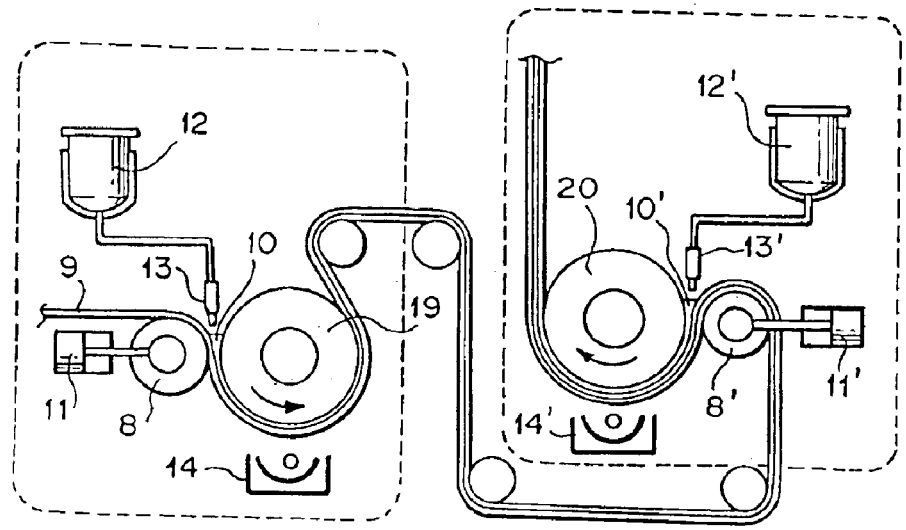
FIG. 10 is a schematic diagram showing a process of manufacturing a lens sheet according to the present invention.

FIGS. 7 to 10 show the manufacturing process of the double-sided prism sheet shown in FIG. 2. Especially, FIGS. 7 and 9 show the cylindrical lens-forming mold used in a process of manufacturing a lens sheet according to the present invention, FIG. 8 shows a thin-plate lens forming mold for use in preparing the cylindrical lens-forming mold of wrapping type. FIG. 10 is a schematic diagram showing a process of manufacturing a lens sheet according to the present invention.

In FIG. 10, reference numeral 19 denotes a first cylindrical lens-forming mold having the first lens portion transferring pattern on the repipheral surface, which is composed of a plurality of the lens unit transferring portion corresponding to the plurality of the lens units such as elongated prisms on one side of the lens sheet. Reference numeral 20 denotes a second cylindrical lens-forming mold having the second lens portion transferring pattern on the repipheral surface, which is composed of a plurality of the lens unit transferring portion corresponding to the plurality of the lens units such as elongated prisms on the other side of the lens sheet. The first and second lens forming molds may be made of the same material as the above-mentioned lens forming mold 7, and are preferably metallic mold in view of heat resistance, strength, etc. At least one of the first and second lens forming molds 19, 20 is a cylindrical lens forming mold of wrapping type obtained by wrapping a thin-plate lens mold 15 round a cylindrical core roll 16, thereby fixing the former to the latter, as shown in FIGS. 8 and 9. The thin-plate lens mold 15 can be obtained by cutting a thin-plate lens mold 15' having the lens portion transferring pattern so that the lens unit transferring portion 18' extends in an oblique direction of angle α. When wrapping the thin-plate lens mold 15 round the core roll 16, it is necessary to perform the arrangement so that the extending direction of each of the lens unit transferring portion of the lens portion transferring pattern makes a predetermined angle precisely with the axial direction of the core roll 16. It is preferable to coat the cylindrical lens-forming mold of wrapping type with a plated surface layer made of copper, nickel, etc. in order to prevent various kinds of corrosion. With use of the above-mentioned cylindrical lens-forming mold of wrapping type, very fine lens portion transferring pattern in which the lens unit transferring portion extends in a direction oblique to the direction perpendicular to the axis of the cylindrical lens-forming mold or the circumferential direction of the cylindrical lens-forming mold.

In the present invention, the above-mentioned cylindrical lens-forming mold of wrapping type is used as at least one of the lens forming molds. The other lens forming mold may be the same type of the above lens forming mold having the thin-plate lens forming mold 15, or a mold obtained by forming the lens portion transferring pattern 18 directly on the surface of the cylindrical lens forming mold as shown in FIG. 7. It is preferable to use the above lens forming mold of wrapping type if the lens unit transferring portion extends in a direction oblique to the axial direction of the cylindrical lens-forming mold. In this case, the extending direction of the lens unit transferring portion is set when cutting out the thin-plate lens forming mold 15, so that the intersecting angle of directions of the lens units on both sides of the lens sheet to be manufactured becomes the predetermined value. On the other hand, when the lens forming mold is used so that each of the lens unit transferring portions of the lens portion transferring pattern extends in a direction parallel to the axis of the cylindrical lens forming mold or in the peripheral direction of the cylindrical lens forming mold, the above-mentioned mold obtained by forming the lens portion transferring pattern directly on the surface of the cylindrical lens forming mold may be used as the other of the cylindrical lens forming molds. In such a case, in order to make the surface damaged by processing such as cutting uniform, it may be possible to form a plated layer made of copper, nickel or the like with considerable thickness on the core roll, and to form the lens portion transferring pattern on the plated layer.

The method of manufacturing a lens sheet with use of the above cylindrical lens-forming mold will be described hereunder with reference to FIG. 10. The manufacturing apparatus includes a first lens forming part where the first lens portion is formed on the first side of the transparent substrate 9 with use of the first cylindrical lens forming mold 19, and a second lens forming part where the second lens portion is formed on the second side of the transparent substrate 9 with use of the second cylindrical lens forming mold 20.

The transparent substrate 9 is fed along the surface having the lens portion transferring pattern of the first cylindrical lens forming mold 19, and the activation energy curing composition 10 is continuously fed to the area between the first cylindrical lens mold 19 and the transparent substrate 9 from the tank 12 via the nozzle 13. The nip roll 8 for making the thickness of the first layer of the activation energy curing composition 10 fed uniform which is the same as that of FIG. 4 is disposed at the outside of the transparent substrate 9 (opposite side to the side of lens forming mold 19). It is necesary to make the nip roll 8 in sufficient for regulating the thickness of the activation energy curing composition 10, and therefore the pressure is applied to the nip roll 8 by means of the same pressure regulating mechanism 11 as shown in FIG. 4.

After the first activation energy curing composition 10 is fed to the area between the first lens forming mold 19 and the transparent substrate 9, the composition is irradiated with the activation energy from the same activation energy irradiating device 14 as shown in FIG. 4 via the transparent substrate 9, while the composition is in a form of layer sandwiched by the first lens forming mold 19 and the transparent substrate 9, to polymerize and cure the first composition layer, thereby transferring the lens portion transferring pattern of the first lens forming mold 19 into the composition to form the first lens portion in the first activation energy curing resin layer on a surface (first side) of the transparent substrate 9.

Then, the transparent substrate 9 with the first lens portion formed on one surface thereof is introduced into the second lens forming part, where the substrate 9 is fed along the lens portion transferring pattern surface of the second cylindrical lens forming mold 20 so that the surface of the transparent substrate 9 at the opposite side to the side of the first lens portion is in contact with the lens portion transferring pattern surface of the second cylindrical lens-forming mold 20. When it is necessary to coincide the optical axes of the lenticular lens units on both sides with each other as in the case of the both-sided lenticular lens sheet, it is preferable to position the second lens forming mold 20 at a certain distance from the first lens forming mold 19. In such a case, the interval between the first and second lens forming molds 19, 20 is necessary to be set to a value greater, typically by 1 mm or more, than the thickness of the lens sheet having the first lens portion on the transparent substrate 9. The second lens forming mold 20 may be movable in the axial direction of the cylindrical mold in order to adjust the relationship of the lens units to be formed on both sides. The activation energy curing composition 10' is continuously fed to the area between the second cylindrical lens mold 20 and the transparent substrate 9 from the tank 12' via the nozzle 13'. The nip roll 8' for making the thickness of the second layer of the activation energy curing composition 10' fed uniform is disposed at the outside of the transparent substrate 9 (opposite side to the side of lens forming mold 20). After the second activation energy curing composition 10' is fed to the area between the second lens forming mold 20 and the transparent substrate 9, the composition is irradiated with the activation energy from the activation energy irradiating device 14' via the first activation energy curing resin and the transparent substrate 9, while the composition is in a form of layer sandwiched by the second lens forming mold 20 and the transparent substrate 9, to polymerize and cure the second activation energy curing composition layer, thereby transferring the lens portion transferring pattern of the second lens forming mold 20 into the composition to form the second lens portion in the second activation energy curing resin layer on the other surface (second side) of the transparent substrate 9.

The both-sided prism sheet thus obtained has a transparent substrate 2 and lens portions 3, 4 each having a plurality of elongated prisms of substantially triangular cross section which extend in parallel to each other, the lens portions being disposed at both sides of the transparent substrate 2 via relaxation layers 1, 1', as shown in FIG. 2. The vertical angle of the prisms on the lens portion 3 is preferably within the range of 50° to 75°, and the vertical angle of the prisms on the lens portion 4 is preferably within the range of 110° to 160°.

The prisms of vertical angle of 50° to 75° function to control the directive emitting light from the light emitting face in oblique direction relative to the normal line of the light emitting face of the plate-shaped light guide of the planar light source device of edge lighting type so that the direction of controlled light become nearer to the normal line direction of the light emitting face of the plate-shaped light guide in a plane (referred to as "horizontal plane") perpendicular to both the light incident face of the light guide (edge surface of the light guide confronting the light source) and the light emitting face of the light guide. By setting the vertical angle to 50° to 75°, the controlled light is directed nearly in the normal direction of the light emmitting face, that is within the typical range of viewing angle. The vertical angle is preferably within the range of 55° to 70°. On the other hand, the prisms of vertical angle of 110° to 160° function to control the diffused emitting light from the light emitting face of the plate-shaped light guide in a plane (referred to as "vertical plane") parallel to the light incident face of the light guide so that the direction of controlled light become concentrated near to the normal line direction of the light emitting face of the plate-shaped light guide in the vertical plane, while in the horizontal plane the distribution angle of the controlled light is rather widened. By setting the vertical angle to 110° to 160°, the viewing angle range can be widened while avoiding the lowering of luminance in the normal direction of the light emitting surface. The vertical angle of the prisms of the lens portion 4 is preferably within the range of 113° to 145°, more preferably 120° to 140°.

The prisms of the lens portions 3, 4 formed on both sides of the double-sided prism sheet may be made to have the same direction of the ridgeline. However, it is preferable to set the directions of the ridgeline of prisms of the lens portions 3, 4 different from each other because such an arrangement enables the controls in both direction and distribution of the light in both the vertical plane and the horizontal plane thereby enhancing the balance of the luminance and viewing angle. It is preferable to arrange the prisms on the both sides so that the intersecting angle (prism intersecting angle) of the directions of ridgeline of the prisms is within the range of 5° to 60°. When the prism intersecting angle is less than 5°, the luminance tends to become lower. On the other hand, when the prism intersecting angle is more than 60°, the effective viewing angle in the vertical plane tends to become narrower. The prism intersecting angle is preferably within the range of 10° to 50°, more preferably 15° to 40°. By forming the prisms on the both sides with the prism intersecting angle as mentioned in the above, the direction of the directive emitting-light from the light guide is varied toward the normal direction by the prisms of the lens portion 3 on one side of the prism sheet and the distribution of the light is widened by the prisms of the lens portion 4 on the other side of the prism sheet in the horizontal plane, while the direction of the light is concentrated to the normal direction by the prisms of the lens portion 4 on the other side of the prism sheet in the vertical plane, whereby enhancing the luminance and widening the effective viewing angle in the vertical plane of the light guide.

The most preferable range of the prism intersecting angle is varied according to the vertical angle of the prisms of the lens portion 4. It is preferable to set the most preferable range of the prism intersecting angle narrower as the vertical angle of the prisms becomes greater in view of balance of enhancing the luminance and widening the viewing angle. For example, when the vertical angle of the prisms of the lens portion 4 is 130° to 140°, the prism intersecting angle is preferably set within the range of about 5° to 40°. In view of quality and productivity of the prism sheet, especially improvement in the precision in cutting the prism forming mold and suppressing occurrence of cutting defect such as burr, etc., greater vertical angle of the prisms of the lens portion 4 is preferable.

A planar light source device having the above both-sided prism sheet is constituted by a linear light source 22 such as fluorescent lamp, a light guide 23 which has at least one light incident face 23A which confronts the light source 22, and a light emitting face 23B which is substantially perpendicular to the light incident face, and the both-sided prism sheet 21 which is disposed on the light emitting face 23B of the light guide 23. The light guide 23 is a transparent, substantially rectangular plate-shaped body, one of the principal surface of which functions as the light emitting face 23B, while one side surface (edge surface) of which functions as the light incident face 23A. The linear light source extends in parellel to the light incident face 23A along the lengthwise direction thereof.

The prism sheet 21 is preferably arranged so that the prism portion 3 having the elongated prisms of vertical angle of 50° to 75° confronts the light emitting face 23B of the light guide 23, and the direction of the ridgeline of the prisms is substantially in parallel to the light incident face 23A of the light guide 23. On a rear surface 23C opposite to the light emitting face 23B of the light guide 23, a reflection layer 24 formed of reflection film, deposition layer, etc. is disposed. In order to efficiently introduce the light from the light source 22 into the light guide 23, a reflector 25 formed of a case or film, etc. having inner surface coated with reflection material is dispoded so as to surround the light source 22 and the light incident face 23A. A side surface (edge surface) 23D opposite to the light incident face 23A may function as another light incident face, if another linear light source and another reflector which are the same as the linear light source 22 and the reflector 25 respectively are disposed so as to confront the side surface 23D.

In the planar light source device, the light which is emitted by the light source 22 and incident onto the light incident face 23A, and which has an incident angle distribution over the critical angle, propagates in the light guide 23 while being totally reflected repetitively by the light emitting face 23B and the rear surface 23C of the light guide 23. In the light emitting face 23B and/or the rear surface 23C of the light guide 23, there is formed a means for causing directive light emission described hereinafter. The light propagating in the light guide 23 is emitted from the light emitting face 23B or the rear surface 23C to the outside of the light guide 23 by the means for causing directive light emission. The emitted light from the rear surface 23C is reflected by the reflecting layer 24 and introduced into the light conductor 23 again. In the present invention, the light emitted by the light emitting face 23B of the light guide 23 is preferably highly directive light in view of obtaining high luminance, that is, the direction of the peak light in the light intensity distribution of the emitted light makes an angle of 50° to 80° relative to the normal line of the light emitting face, and the half value width of the light intensity distribution of the emitted light is set to 10° to 35°. The reason is that the luminance is sufficiently enhanced when the direction of the peak light makes the angle of 50° or more and the half value width is set to 35° or less, and the distribution of the emitted light can be widened to the extent sufficient for obtaining necessary effective viewing angle when the direction of the peak light makes the angle of 80° or less and the half value width is set to 10° or more.

As the means for causing directive light emission in the light guide 23, there are exemplified fine roughness formed on at least one principal surface (that is, at least one of the light emitting face 23B and the rear surface 23C), coated or printed white light-diffusing paint or the like on at leat one principal surface, light diffusing particles dispersed in the light guide 23. Of these, fine roughness formed and light diffusing particles dispersed are preferable in view of obtaining highly directive light. The fine roughness may be uniformly roughened surface or a plurality of lens units. Average slant angle of the fine roughness is preferably about 2° to 10° in order to balance the enhancement of luminance and the uniformity of luminance within the light emitting face 23B of the light guide 23. The average slant angle ($\theta a$) can be calculated according to ISO 4287/1-1984 as follows: The surface roughness of the roughened surface is measured by a probe tracing type surface roughness tester, and the average slant angle ($\theta a$) is obtained by the following equations (1) and (2) on the basis of function f(x) obtained by the tester:

$$\Delta a = (1/L) \int_0^L |(d/dx)f(x)| dx \quad (1)$$

$$\theta a = \tan^{-1} \Delta a \quad (2)$$

wherein L represents a distance scanned by the probe.

The emission rate of the light emitted from the light guide 23 can be increased so as to obtain sufficiently high luminance if the average slant angle ($\theta a$) is set to 2° or more, while the emission rate of the light emitted from the light guide 23 can be reduced so as to obtain sufficiently high uniformity of luminance within the light emitting face if the average slant angle ($\theta a$) is set to 10° or less.

The fine roughness may be substantially isotropic or anisotropic. As the isotropic fine roughness, there are exemplified a plurality of fine ridge/grooves or projections such as elongated prisms or lenticular lenses. The pitch of the isotropic fine roughness is preferably about 1 $\mu$m to 2 mm, and the direction of the prisms or lenticular lenses may be substantially in parallel or perpendicular to the light incident face 23B of the light guide 23. The light diffusing material dispersed in the light guide 23 may be organic particles such as resin particles or inorganic particles such as glass beads. The light diffusing material may be transparent minute particles having the diameter of about 2 $\mu$m to 100 $\mu$m, preferably 4 $\mu$m to 50 $\mu$m and the refractive index different from material of the light guide 23. The light diffusing material may be diffused in the whole of the light guide 23 with uniform or ununiform distribution of concentration, or may be diffused in the light guide 23 so as to form a light diffusing layer in the neighborhood of the light emitting face 23B or the rear surface 23C.

The processing method of forming the roughened surface as the fine roughness on the light guide 23 is not restricted to the specific one, and may be a method of transferring under heat/pressure a roughened surface of the metallic mold obtained by chemical etching process with use of fluoric acid or blasting process of fine particles such as glass beads, etc., another method of coating or fixing of transparent roughness-forming material by printing, etc., or the other method of directly processing the light guide 23 by blasting or etching.

A transparent plate-shaped member of glass or synthetic resin, etc. may be used as the light guide 23. As the synthetic resin, there may be used various kinds of highly transparent synthetic resins such as acrylic resin, polycarbonate resin, vinyl chloride resin, etc. These resins may be molded into a plate-shaped member by typical molding method such as extrusion molding, injection molding, or the like to form the light guide. Particularly, methacrylic resin is excellent in light transmission, heat resistance, mechanical property and molding and processing performance etc., and therefore it is more suitable as the material for the light guide. Particularly, the methacrylic resin containing methylmethacrylate as the primary ingredient has preferably the methylmethacrylate of 80% by weight or more. The light guide 23 may be planar shape, wedge shape, concave shape, etc. in cross section. In the planar light source device, various kinds of optical element other than the above-mentioned lens sheet may be used for varying the direction of light, causing convergence or diffusion of light, varying the optical property of light, etc. such as light diffusing sheet, color filter, polarizing sheet, etc.

If a liquid crystal display device LC is mounted on the light emitting face side (the side of the prism sheet 21) of the planar light source device thus constructed, there is provided a liquid crystal display apparatus for use in portable personal computer, liquid crystal television, etc. Furthermore, by mounting a signboard in which characters, figures, photographs or the like are formed on a semi-transparent plastic plate such as acrylic resin plate by cutting, printing, etc., there is provided a sign display apparatus such as a guide signboard or a large-scale signboard used in a railway station, public facilities or the like, or a traffic sign display apparatus.

In the above embodiment, the double-sided prism sheet shown in FIG. 2 is used for constituting the planar light source device for the liquid crystal display apparatus, etc. In the same manner as the double-sided prism sheet, the single-sided prism sheet shown in FIG. 1 is also used for constituting the planar light source device having the structure of FIG. 11. In this case, when the prism sheet is disposed on the light guide so as to position the prism portion side thereof at the opposite side to the side of the light guide 23, a light diffiusing sheet may be disposed between the light guide and the prism sheet.

Figure 12:
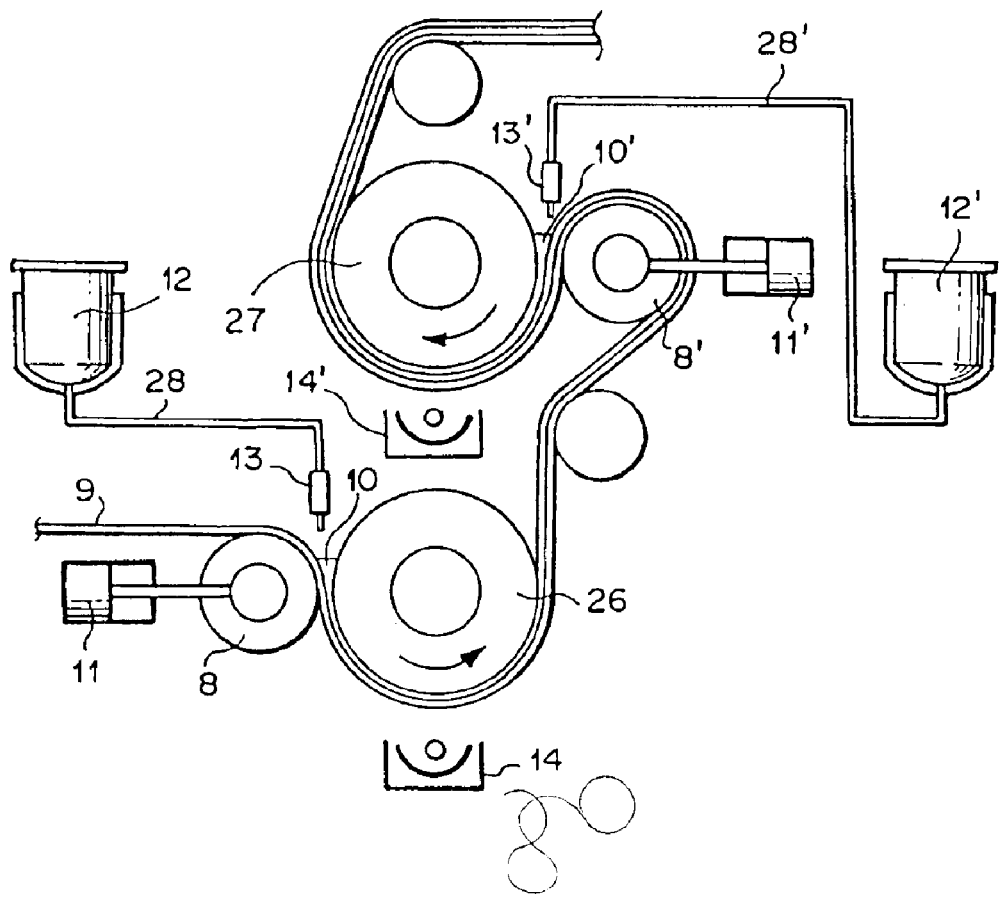
FIG. 12 is a schematic diagram showing a process of manufacturing a lens sheet according to the present invention.

FIG. 12 is a schematic diagram showing the manufacturing process of the double-sided lenticular lens sheet shown in FIGS. 3A and 3B.

In FIG. 12, reference numerals 26, 27 each denote a cylindrical lens-forming mold (roll-shaped mold) having a lens portion transferring pattern on the repipheral surface, which is composed of a plurality of the lens unit transferring portion corresponding to the plurality of lenticular lens units on each side of the lens sheet. The lens forming molds may be made of the same material as the above-mentioned lens forming mold 7, and are preferably metallic mold in view of heat resistance, strength, etc. In the present invention, the lens forming mold 26 is not restricted to roll-shaped mold, but may be plate-shaped mold. The roll-shaped mold may be obtained by wrapping a thin-plate lens mold 15 having the lens portion transferring pattern round a cylindrical core roll 16, as shown in FIGS. 5 and 6.

The transparent substrate 9 is fed along the surface having the lens portion transferring pattern of the first cylindrical lens forming mold 26, and the activation energy curing composition 10 is continuously fed to the area between the first cylindrical lens forming mold 26 and the transparent substrate 9 from the tank 12 via the nozzle 13. The nip roll 8 for making the thickness of the first layer of the activation energy curing composition 10 fed uniform which has the pressure regulating mechanism 11 and is the same as that of FIG. 4 is disposed at the outside of the transparent substrate 9 (opposite side to the side of lens forming mold 26).

After the first activation energy curing composition 10 is fed to the area between the first lens forming mold 26 and the transparent substrate 9, the composition is irradiated with the activation energy from the same activation energy irradiating device 14 as shown in FIG. 4 through the transparent substrate 9, while the composition is in a form of layer sandwiched by the first lens forming mold 26 and the transparent substrate 9, to polymerize and cure the first composition layer, thereby transferring the lens portion transferring pattern of the first lens forming mold 26 into the composition to form the first lenticular lens portion in the first activation energy curing resin layer on a surface (first side) of the transparent substrate 9.

Then, the transparent substrate 9 with the first lenticular lens portion formed on one surface thereof is introduced into the second lens forming part, where the substrate 9 is fed along the lens portion transferring pattern surface of the second cylindrical lens forming mold 27 so that the surface of the transparent substrate 9 at the opposite side to the side of the first lenticular lens portion is in contact with the lens portion transferring pattern surface of the second cylindrical lens-forming mold 27. The activation energy curing composition 10' is continuously fed to the area between the second cylindrical lens mold 27 and the transparent substrate 9 from the tank 12' via the nozzle 13', as in the case of forming the first lenticular lens portion. The nip roll 8' for making the thickness of the second layer of the activation energy curing composition 10' fed uniform is disposed at the outside of the transparent substrate 9 (opposite side to the side of lens forming mold 27).

After the second activation energy curing composition 10' is fed to the area between the second lens forming mold 27 and the transparent substrate 9, the composition is irradiated with the activation energy from the activation energy irradiating device 14' through the first activation energy curing resin and the transparent substrate 9, while the composition is in a form of layer sandwiched by the second lens forming mold 27 and the transparent substrate 9, to polymerize and cure the second activation energy curing composition layer, thereby transferring the lens portion transferring pattern of the second lens forming mold 27 into the composition to form the second lenticular lens portion in the second activation energy curing resin layer on the other surface (second side) of the transparent substrate 9.

Hereinafter, the present invention will be described in more detail with non-limitative Examples and Comparative Examples.

EXAMPLE 1

Figure 13:
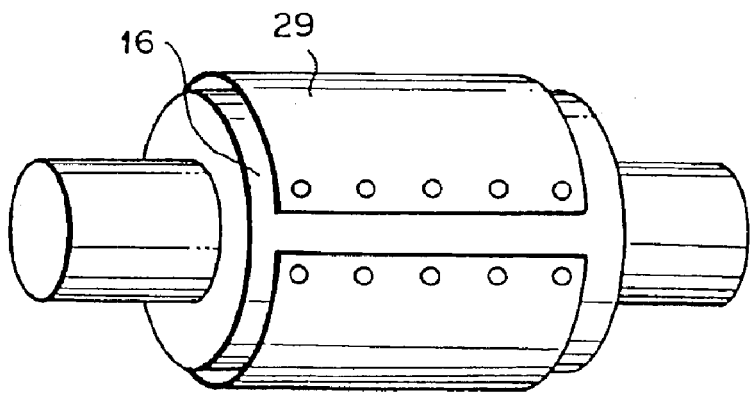
FIG. 13 shows a cylindrical lens-forming mold used in a process of manufacturing a lens sheet according to the present invention.

As shown in FIG. 13, a thin-plate lens forming mold 29 was provided, which has a prism portion transferring pattern on the surface of a thin plate made of brass (JIS Brass Type 3) having a thickness of 1.0 mm and a size of 400 mm×690 mm. The prism portion transferring pattern was for use in transfer-forming of a prism portion having a plurality of elongated prisms extending in parallel to each other, the prisms having an isosceles triangular cross section of the vertical angle of 90°, the height of 25 $\mu$m and the pitch of 50 $\mu$m. The thin-plate lens forming mold 29 was coated with an electroless nickel plated layer. Then, a cylindrical roll 16 made of stainless steel having the diameter of 220 mm and the length of 450 mm was provided. The thin-plate lens forming mold 29 was wrapped round the roll 16, and fixed on the circumferential outer surface of the cylindrical roll 16 with screws to obtain a cylindrical lens-forming mold.

Figure 14:
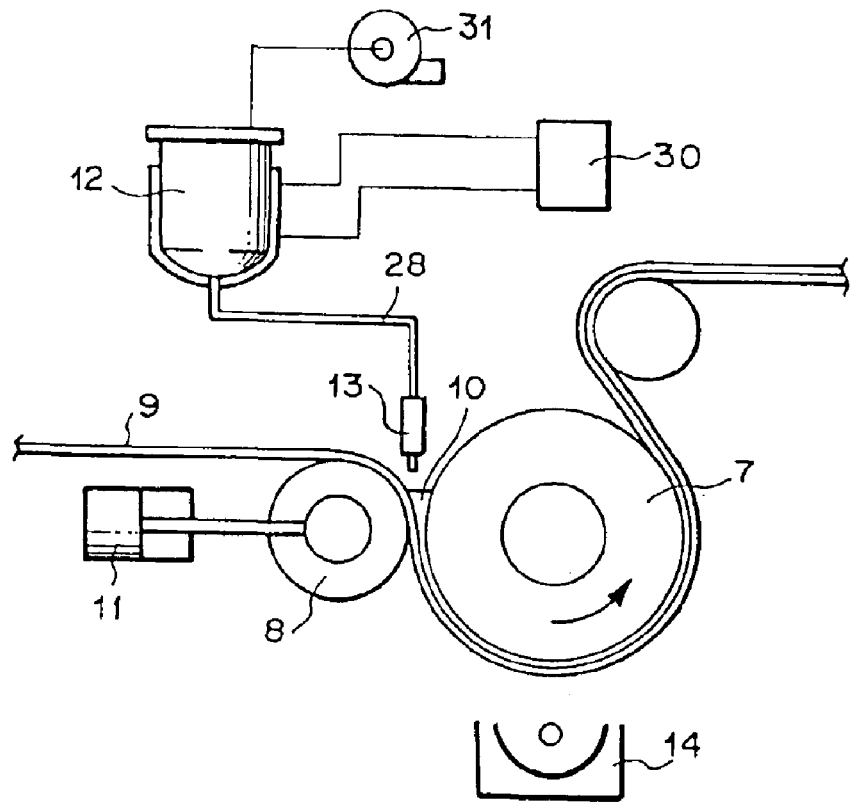
FIG. 14 is a schematic diagram showing a process of manufacturing a lens sheet according to the present invention.

As shown in FIG. 14, a rubber roll (nip roll) 8 made of NBR of rubber hardness of 80° was disposed near the cylindrical lens-forming mold 7 obtained in the above. A polyester film (transparent substrate) 9 having the thickness of 125 $\mu$m which is slightly greater than the length of the lens forming mold 7 was fed to an area between the lens forming mold 7 and the rubber roll 8 along the outer surface of the cylindrical lens forming mold 7. The polyester film 9 was nipped by the rubber roll 8 and the lens forming mold 7 by means of an air cylinder (pressure regulating mechanism) 11 connected with the rubber roll 8. The operational pressure of the air cylinder 11 was 0.1 MPa. As the air cylinder 11 was used an air cylinder manufactured by SMC Co., Ltd. having the air tube diameter of 32 mm. An ultraviolet light irradiating apparatus (activation energy irradiating apparatus) 14 was disposed below the lens forming mold 7. The ultraviolet light irradiating apparatus 14 was of ultraviolet light intensity of 120 W/cm, and constituted by an ultraviolet lamp of 9.6 kW manufactured by Western Quartz o., Ltd., a parallel ray forming reflector of cold mirror type and an electric power source. An ultraviolet curing composition (activation energy curing composition) 10 containing an ingredient for regulating the refractive index, catalyst, etc. was fed into a tank 12 having a portion made of stainless steel (SUS 304) only with which the ultraviolet curing composition 10 was in contact. Furthermore, there was provided a warm water jacket for regulating the temperature of the ultraviolet curing composition 10, into which was fed the warm water of the temperature of 40° C. regulated by a temperature regulating apparatus 30, to thereby maintain the temperature of the ultraviolet curing composition 10 in the tank 12 to 40° C.±1° C. In addition, bubbles generated in the composition during the feeding process thereof was removed therefrom by reducing the pressure in the tank 12 with use of vacuum pump 31.

The ultraviolet curing composition 10 was as follows, and the viscosity thereof was set to 300 mPa·S/25° C.:

Phenoxyethylacrylate [Viscoat #192, manufactured by Osaka Yuki Kagaku Kogyo Co., Ltd.] . . . 50 parts by weight Bisphenol A-diepoxy-acrylate [Epoxy ester 3000A, manufactured by Kyoeisha Yushi Kagaku Kogyo Co., Ltd.] . . . 50 parts by weight 2-hydroxy-2-methyl-1-phenyl-propane-1-one [Darocur 1173, manufactured by Ciba-Geigy AG] . . . 1.5 parts by weight After the pressure in the tank 12 was made normal pressure and the tank was sealed, air pressure of 0.02 MPa was charged into the inside of the tank 12, and a valve provided at the lower portion of the tank 12 was made open, so that the ultraviolet curing composition 10 was fed onto one side of the polyester film 9 nipped by the rubber roll 8 and the lens forming mold 7 via a pipe line 28 and nozzle 13 whose temperature were suitably regulated. As the nozzle 13 was used a valve (AV 101, manufactured by Iwashita Engineering Co., Ltd.) having a needle (MN-18-G13, manufactured by Iwashita Engineering Co., Ltd.). The cylindrical lens forming mold 7 was rotated in the direction of arrow at a circumferential speed of 3.5 m per minute with use of a 0.2 kW geared motor of reduction ratio of 1/200 (manufactured by Mitsubishi Denki Co., Ltd.). With the ultraviolet light from the ultraviolet light irradiation apparatus 14 was irradiated the ultraviolet curing composition 10 while being sandwiched between the lens forming mold 7 and the polyester film 9, so that the ultraviolet curing composition 10 was polymerized and cured while being transferred the prism portion transferring pattern of the lens forming mold 7. Then, the ultraviolet curing composition 10 was released from the lens forming mold 7 to thereby obtain a prism sheet (lens sheet).

Figure 11:
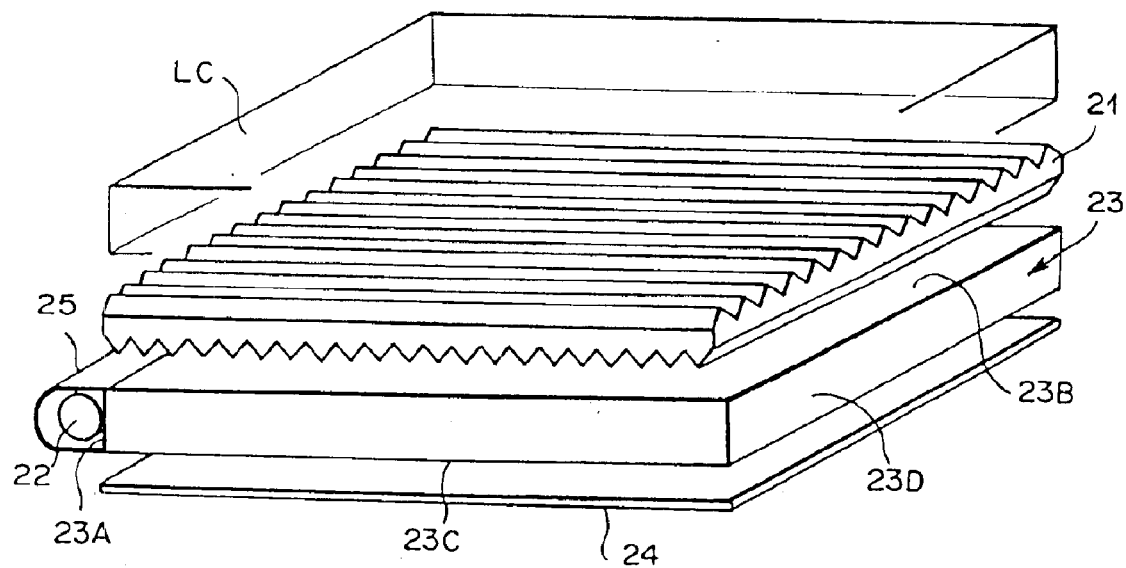
FIG. 11 is a schematic perspective view showing a planar light source device having a double-sided prism sheet according to the present invention.

The cross section of the prism sheet thus obtained was observed by a scanning electron microscope (×2000, JSM-840A, manufactured by Nippon Denshi Co., Ltd.). The height and vertical angle of each elongated prism and the arrangement pitch of the prisms were substantially the same as the designed values. A relaxation layer having the thickness of 2 μm (8% of the lens height) was formed between the polyester film 9 and the prism portion, and there was observed substantially no deformation of the prism shape based on the shrinkage caused by polymerization. As shown in FIG. 11, the prism sheet was disposed on the light emitting face of the light guide made of acrylic resin via a light diffusing film, so that the prism surface of the prism sheet was at the upper side. A cold cathode lamp was disposed in the neighborhood of a side surface of the light guide, and the other side surfaces and the rear surface were covered with reflection sheet. The cold cathode lamp was turned on to observe the planar light source device. The optical defect such as spot patterns was not observed in the planar light source device, so that the device was defined as excellent in optical property.

EXAMPLE 2

A prism sheet (lens sheet) was obtained in the same manner as Example 1 except the following: There was used a cylindrical lens-forming mold which was constituted by a thin-plate lens forming mold with step portion, which had a prism portion transferring pattern and a pair of step portions. The step portions having the width of 10 mm were located at both ends of a thin plate made of brass (JIS Brass Type 3) having a thickness of 1.0 mm and a size of 400 mm×690 mm. The prism portion transferring pattern was located at an area between the step portions, where the thickness of the thin plate was reduced by 0.002 mm as compared with the step portions. The prism portion transferring pattern was for use in transfer-forming of a prism portion having a plurality of elongated prisms extending in parallel to each other, the prisms having an isosceles triangular cross section of the vertical angle of 65°, the height of 39 μm and the pitch of 50 μm.

The cross section of the prism sheet thus obtained was observed by a scanning electron microscope (×2000, JSM-840A, manufactured by Nippon Denshi Co., Ltd.). The height and vertical angle of each elongated prism and the arrangement pitch of the prisms were substantially the same as the designed values. A relaxation layer having the thickness of 2 μm (5% of the lens height) was formed between the polyester film 9 and the prism portion, and there was observed substantially no deformation of the prism shape based on the shrinkage caused by polymerization. As shown in FIG. 11, the prism sheet was disposed on the light emitting face of the light guide made of acrylic resin, so that the prism surface of the prism sheet was at the lower side. A cold cathode lamp was disposed in the neighborhood of a side surface of the light guide, and the other side surfaces and the rear surface were covered with reflection sheet. The cold cathode lamp was turned on to observe the planar light source device. The optical defect such as spot patterns was not observed in the planar light source device, so that the device was defined as excellent in optical property.

EXAMPLE 3

Figure 15:
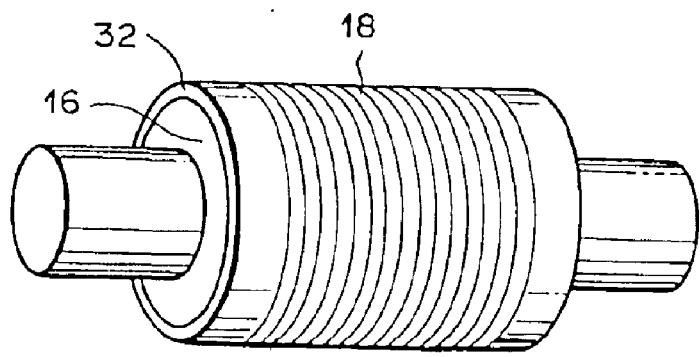
FIG. 15 shows a cylindrical lens-forming mold used in a process of manufacturing a lens sheet according to the present invention.

As shown in FIG. 15, a hard copper plated layer 32 of Vickers hardness of 200 having the thickness of 100 μm was formed on the circumferential outer surface of a core roll 16 made of iron having the diameter of 200 mm and the length of 450 mm. On the copper plated layer 32, there is formed a prism portion transferring pattern for use in transfer-forming of a prism portion having a plurality of elongated prisms extending in parallel to each other, the prisms having an isosceles triangular cross section of the vertical angle of 65°, the height of 39 μm and the pitch of 50 μm, to thereby obtain a first cylindrical lens-forming mold. The prism portion transferring pattern had a plurality of elongated prism transferring portions 18 extending in parallel to each other in the circumferential direction of the core roll 16 which is perpendicular to the axial direction of the core roll 16.

Figure 16:
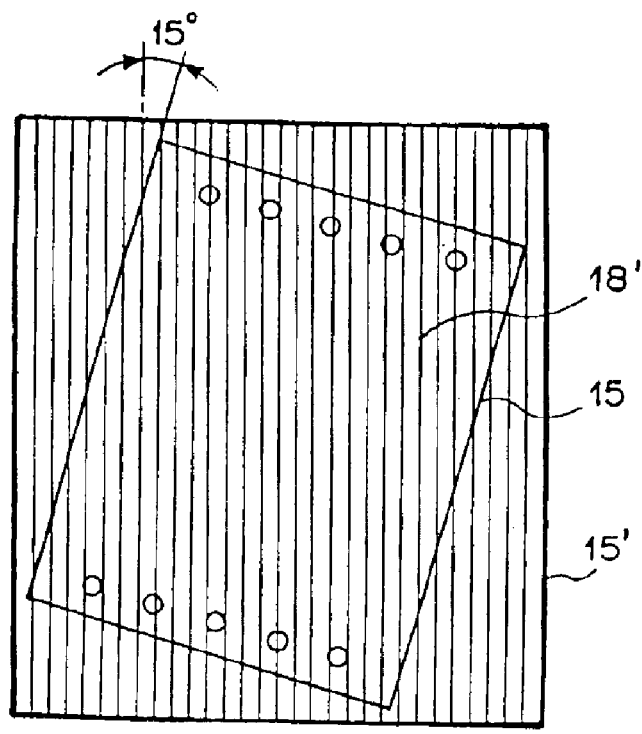
FIG. 16 shows a thin-plate lens forming mold for use in cylindrical lens forming mold of wrapping type.
Figure 17:
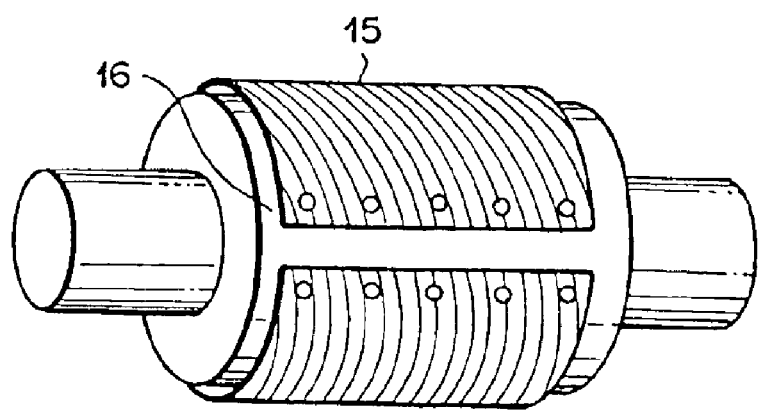
FIG. 17 shows a cylindrical lens-forming mold used in a process of manufacturing a lens sheet according to the present invention.

On the other hand, as shown in FIG. 16, a thin-plate lens forming mold 15' was provided, which has a prism portion transferring pattern on the surface of a thin plate made of brass (JIS Brass Type 3) having a thickness of 1 mm and a size of 700 mm×850 mm. The prism portion transferring pattern was for use in transfer-forming of a prism portion having a plurality of elongated prisms extending in parallel to each other, the prisms having an isosceles triangular cross section of the vertical angle of 130°, the height of 12 μm and the pitch of 50 μm. The thin-plate lens forming mold 15' was coated with an electroless nickel plated layer having the thickness of 1 μm in order to prevent various kinds of corrosions. Then the thin-plate lens forming mold 15' was cut in a rectangular shape of the size of 400 mm×690 mm, so that the direction of a pair of edges of the rectangular shape intersected the direction of the elongated prism transferring portions 18' at 15°, to thereby obtain a thin-plate lens forming mold 15. Then, a core roll 16 made of stainless steel having the diameter of 220 mm and the length of 450 mm was provided. The thin-plate lens forming mold 15 was wrapped round the roll 16, and fixed on the circumferential outer surface of the core roll 16 with screws to obtain a second cylindrical lens-forming mold of wrapping type as shown in FIG. 17.

Figure 18:
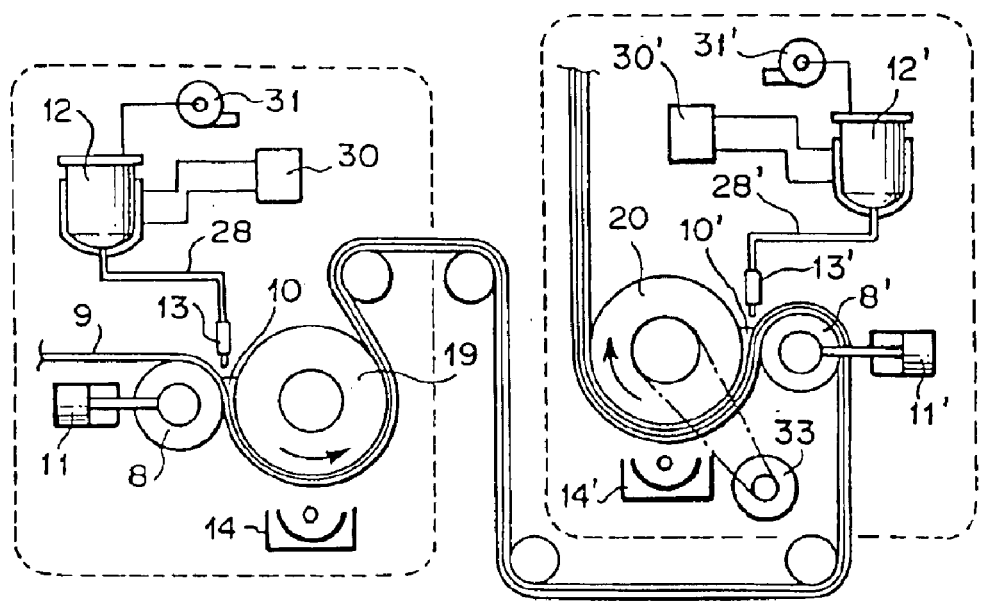
FIG. 18 is a schematic diagram showing a process of manufacturing a lens sheet according to the present invention.

As shown in FIG. 18, the first cylindrical lens-forming mold 19 and the second cylindrical lens-forming mold 20 obtained in the above were disposed in a first lens forming part and a second lens forming part, respectively. Rubber rolls 8, 8' made of NBR of rubber hardness of 80° were disposed near the first and second cylindrical lens-forming molds 19, 20, respectively. A polyethylene terephthalate film (PET film) (transparent substrate) 9 having the thickness of 188 μm which is slightly greater than the length of the first lens forming mold 19 was fed to an area between the first lens forming mold 19 and the first rubber roll 8 along the outer surface of the first cylindrical lens forming mold 19. The PET film 9 was nipped by the first rubber roll 8 and the first lens forming mold 19 by means of a first air cylinder 11 connected with the first rubber roll 8. The operational pressure of the first air cylinder 11 was 0.1 MPa. As the first air cylinder 11 was used an air cylinder manufactured by SMC Co., Ltd. having the air tube diameter of 32 mm. A first ultraviolet light irradiating apparatus 14 was disposed below the first lens forming mold 19. The first ultraviolet light irradiating apparatus 14 was of the ultraviolet light intensity of 120 W/cm, and constituted by an ultraviolet lamp of 9.6 kW manufactured by Western Quartz Co., Ltd., a parallel ray forming reflector of cold mirror type and an electric power source. A first ultraviolet curing composition 10 containing an ingredient for regulating the refractive index, catalyst, etc. was fed into a first tank 12 having a portion made of stainless steel (SUS 304) only with which the first ultraviolet curing composition 10 was in contact. Furthermore, there was provided a warm water jacket for regulating the temperature of the first ultraviolet curing composition 10 to 40° C.±1° C., into which was fed the warm water of the temperature of 40° C. regulated by a first temperature regulating apparatus 30, to thereby maintain the temperature of the ultraviolet curing composition 10 in the tank 12 constant. In addition, bubbles generated in the composition during the feeding process thereof was removed therefrom by reducing the pressure in the first tank 12 with use of a first vacuum pump 31.

The first ultraviolet curing composition 10 was as follows, and the viscosity thereof was set to 300 mPa·S/40° C.:

Phenoxyethylacrylate [Viscoat #192, manufactured by Osaka Yuki Kagaku Kogyo Co., Ltd.] . . . 50 parts by weight Bisphenol A-diepoxy-acrylate [Epoxy ester 3000A, manufactured by Kyoeisha Yushi Kagaku Kogyo Co., Ltd.] . . . 50 parts by weight 2-hydroxy-2-methyl-1-phenyl-propane-1-one [Darocur 1173, manufactured by Ciba-Geigy AG] . . . 1.5 parts by weight After the pressure in the first tank 12 was made normal pressure and the tank was sealed, air pressure of 0.02 MPa was charged into the inside of the first tank 12, and a valve provided at the lower portion of the tank 12 was made open, so that the first ultraviolet curing composition 10 was fed to an area between the first cylindrical lens-forming mold 19 and the PET film 9 nipped by the first rubber roll 8 and the first cylindrical lens-forming mold 19 via a first pipe line 28 and a first nozzle 13 whose temperature were suitably regulated. As the first nozzle 13 was used a valve (AV 101, manufactured by Iwashita Engineering Co., Ltd.) having a needle (MN-18-G13, manufactured by Iwashita Engineering Co., Ltd.). The first cylindrical lens forming mold 19 was rotated in the direction of arrow at a circumferential speed of 2.0 m per minute with use of a 0.2 kW geared motor of reduction ratio of 1/200 (manufactured by Mitsubishi Denki Co., Ltd.). With the ultraviolet light from the first ultraviolet light irradiation apparatus 14 was irradiated the first ultraviolet curing composition 10 while being sandwiched between the first lens forming mold 19 and the PET film 9, so that the first ultraviolet curing composition 10 was polymerized and cured while forming the first prism portion on one side (first surface) of the PET film 9.

Next, the PET film 9 having the first prism portion on one side thereof was fed to an area between the second cylindrical lens-forming mold 20 of wrapping type and the second rubber roll 8' along the outer surface of the second cylindrical lens-forming mold 20, so that the other side of the PET film 9 confronted the lens-forming mold 20. The PET film 9 was nipped by the second rubber roll 8' and the second lens forming mold 20 by means of a second air cylinder 11' connected with the second rubber roll 8'. The operational pressure of the second air cylinder 11' was 0.1 MPa. A second ultraviolet curing composition 10' containing an ingredient for regulating the refractive index, catalyst, etc. was fed into a second tank 12'. In addition, bubbles generated in the composition during the feeding process thereof was removed therefrom by reducing the pressure in the second tank 12' with use of a second vacuum pump 31'. A second temperature regulating apparatus 30', was provided for the second tank 12' as in the case of the first tank 12.

The second ultraviolet curing composition 10' was as follows, and the viscosity thereof was set to 150 mPa·S/40° C.:

Phenoxyethylacrylate [Viscoat #192, manufactured by Osaka Yuki Kagaku Kogyo Co., Ltd.] . . . 70 parts by weight Bisphenol A-diepoxy-acrylate [Epoxy ester 3000A, manufactured by Kyoeisha Yushi Kagaku Kogyo Co., Ltd.] . . . 30 parts by weight 2-hydroxy-2-methyl-1-phenyl-propane-1-one [Darocur 1173, manufactured by Ciba-Geigy AG] . . . 1.5 parts by weight After the pressure in the second tank 12' was made normal pressure and the tank was sealed, air pressure of 0.02 MPa was charged into the inside of the second tank 12', and a valve provided at the lower portion of the tank 12' was made open, so that the second ultraviolet curing composition 10' was fed to an area between the second cylindrical lens-forming mold 20 and the PET film 9 nipped by the second rubber roll 8' and the second cylindrical lens-forming mold 20 via a second pipe line 28' and a second nozzle 13' whose temperature were suitably regulated. The second cylindrical lens-forming mold 20 was rotated in the direction of arrow at a circumferential speed of 2.0 m per minute with use of a 0.2 kW geared motor of reduction ratio of 1/200 (manufactured by Mitsubishi Denki Co., Ltd.). With the ultraviolet light from the second ultraviolet light irradiation apparatus 14' was irradiated the second ultraviolet curing composition 10' while being sandwiched between the second lens forming mold 20 and the PET film 9, so that the second ultraviolet curing composition 10' was polymerized and cured while forming the second prism portion on the other side (second surface) of the PET film 9. Then, the ultraviolet curing composition 10' was released from the lens forming mold 20 to thereby obtain a double-sided prism sheet in which the intersecting angle of the directions of elongated prisms at one side with that of the other side was 15°.

The cross section of the prism sheet thus obtained was observed by a scanning electron microscope (×2000, JSM-840A, manufactured by Nippon Denshi Co., Ltd.). The height and vertical angle of each elongated prism and the arrangement pitch of the prisms were substantially the same as the designed values. A relaxation layer having the thickness of 2 $\mu$m (5% of the lens height) was formed between the PET film 9 and the prism portion of the vertical angle of 65°, while another relaxation layer having the thickness of 1 $\mu$m (8% of the lens height) was formed between the PET film 9 and the prism portion of the vertical angle of 130°, and there was observed substantially no deformation of the prism shapes based on the shrinkage caused by polymerization. As shown in FIG. 11, the prism sheet was disposed on the light emitting face of the light guide made of acrylic resin, so that the prism surface of the vertical angle of 65° of the prism sheet was at the lower side. A cold cathode lamp was disposed in the neighborhood of a side surface of the light guide, and the other side surfaces and the rear surface were covered with reflection sheet. The cold cathode lamp was turned on to observe the planar light source device. The optical defect such as spot patterns was not observed in the planar light source device, so that the device was defined as excellent in optical property.

EXAMPLE 4

Figure 19:
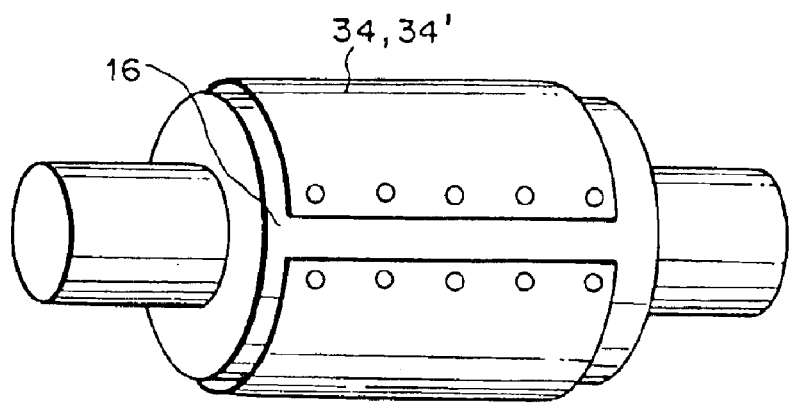
FIG. 19 shows a cylindrical lens-forming mold used in a process of manufacturing a lens sheet according to the present invention.

As shown in FIG. 19, a first thin-plate lens forming mold 34 was provided, which has a lenticular lens portion transferring pattern on the surface of a thin plate made of brass (JIS Brass Type 3) having a thickness of 2.0 mm and a size of 1000 mm×790 mm. The lenticular lens portion transferring pattern was for use in transfer-forming of a lenticular lens portion for light emitting side having the height of 120 $\mu$m and the pitch of 420 $\mu$m. The thin-plate lens forming mold 34 was coated with an electroless nickel plated layer in order to prevent various kinds of corrosions. Then, a cylindrical roll 16 made of stainless steel having the diameter of 250 mm and the length of 1000 mm was provided.

The thin-plate lens forming mold 34 was wrapped round the roll 16, and fixed on the circumferential outer surface of the cylindrical roll 16 with screws to obtain a first cylindrical lens-forming mold. In the same manner, there was obtained a second cylindrical lens-forming mold which was constituted by a second thin-plate lens-forming mold 34' having another lenticular lens portion transferring pattern for use in transfer-forming of another lenticular lens portion for light incident side having the height of 160 $\mu$m and the pitch of 420 $\mu$m.

Figure 20:
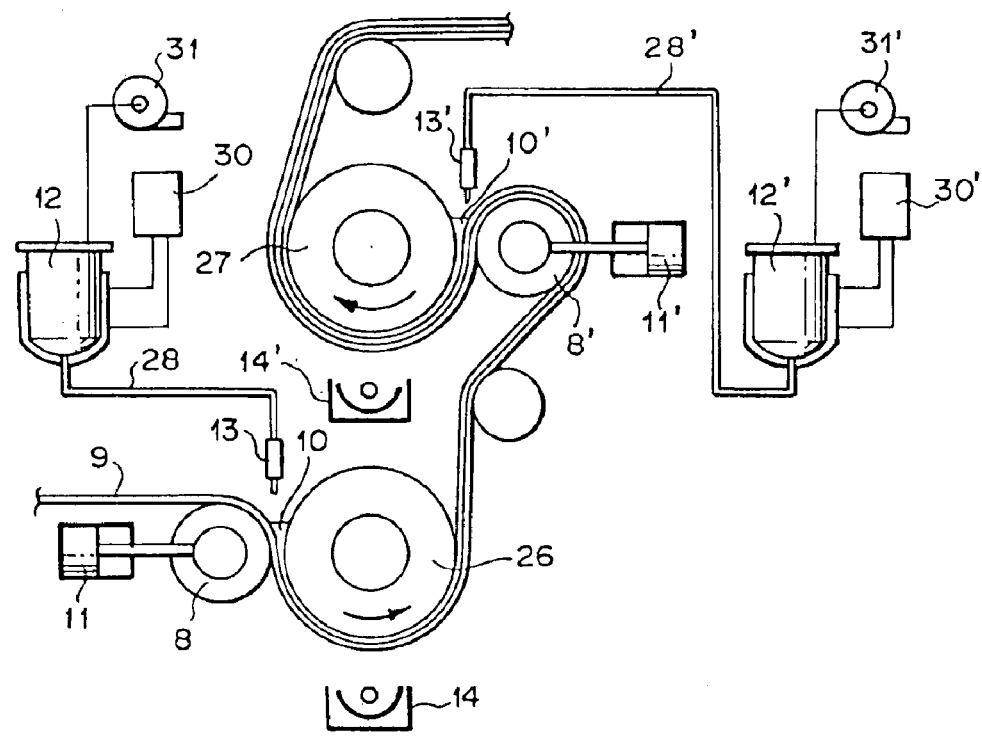
FIG. 20 is a schematic diagram showing a process of manufacturing a lens sheet according to the present invention.

As shown in FIG. 20, rubber rolls 8, 8' made of NBR of rubber hardness of 80° were disposed near the first and second cylindrical lens-forming molds 26, 27 obtained in the above, respectively. A polycarbonate film (transparent substrate) 9 having the thickness of 500 $\mu$m which is slightly greater than the length of the first lens forming mold 26 was fed to an area between the first lens forming mold 26 and the first rubber roll 8 along the outer surface of the first cylindrical lens forming mold 26. The polycarbonate film 9 was nipped by the first rubber roll 8 and the first lens forming mold 26 by means of a first air cylinder 11 connected with the rubber roll 8. The operational pressure of the air cylinder 11 was 0.1 MPa. As the air cylinder 11 was used an air cylinder manufactured by SMC Co., Ltd. having the air tube diameter of 32 mm. A first ultraviolet light irradiating apparatus 14 was disposed below the first lens forming mold 26. The first ultraviolet light irradiating apparatus 14 was of ultraviolet light intensity of 120 W/cm, and constituted by an ultraviolet lamp of 9.6 kW manufactured by Western Quartz Co., Ltd., a parallel ray forming reflector of cold mirror type and an electric power source. A first ultraviolet curing composition 10 containing an ingredient for regulating the refractive index, catalyst, etc. was fed into a first tank 12 having a portion made of stainless steel (SUS 304) only with which the first ultraviolet curing composition 10 was in contact. Furthermore, there was provided a warm water jacket for regulating the temperature of the first ultraviolet curing composition 10 to 40° C.±1° C., into which was fed the warm water of the temperature of 40° C. regulated by a first temperature regulating apparatus 30, to thereby maintain the temperature of the ultraviolet curing composition 10 in the tank 12 constant. In addition, bubbles generated in the composition during the feeding process thereof was removed therefrom by reducing the pressure in the tank 12 with use of a first vacuum pump 31.

The first ultraviolet curing composition 10 was as follows, and the viscosity thereof was set to 600 mPa·S/25° C.:

Phenoxyethylacrylate [Viscoat #192, manufactured by Osaka Yuki Kagaku Kogyo Co., Ltd.] . . . 45 parts by weight Bisphenol A-diepoxy-acrylate [Epoxy ester 3000A, manufactured by Kyoeisha Yushi Kagaku Kogyo Co., Ltd.] . . . 55 parts by weight 2-hydroxy-2-methyl-1-phenyl-propane-1-one [Darocur 1173, manufactured by Ciba-Geigy AG] . . . 1.5 parts by weight After the pressure in the first tank 12 was made normal pressure and the tank was sealed, air pressure of 0.02 MPa was charged into the inside of the tank 12, and a valve provided at the lower portion of the tank 12 was made open, so that the first ultraviolet curing composition 10 was fed onto the polycarbonate film 9 nipped by the first rubber roll 8 and the first lens forming mold 26 via a first pipe line 28 and a first nozzle 13 whose temperature were suitably regulated. As the nozzle 13 was used a valve (AV 101, manufactured by Iwashita Engineering Co., Ltd.) having a needle (MN-18-G13, manufactured by Iwashita Engineering Co., Ltd.). The first cylindrical lens-forming mold 26 was rotated in the direction of arrow at a circumferential speed of 2.0 m per minute with use of a 0.2 kW geared motor of reduction ratio of 1/200 (manufactured by Mitsubishi Denki Co., Ltd.). With the ultraviolet light from the first ultraviolet light irradiation apparatus 14 was irradiated the first ultraviolet curing composition 10 while being sandwiched between the first lens forming mold 26 and the polycarbonate film 9, so that the first ultraviolet curing composition 10 was polymerized and cured while forming the light emitting side lenticular lenses on one side of the polycarbonate film 9.

Next, the polycarbonate film 9 having the light emitting side lenticular lenses on one side thereof was fed along the outer surface of the second cylindrical lens-forming mold 27, so that the other side of the polycarbonate film 9 confronted the lens-forming mold 27. The polycarbonate film 9 was nipped by the second rubber roll 8' and the second lens forming mold 27 by means of a second air cylinder 11' connected with the second rubber roll 8'. The operational pressure of the second air cylinder 11' was 0.1 MPa. A second ultraviolet curing composition 10' containing an ingredient for regulating the refractive index, catalyst, etc. was fed into a second tank 12'. In addition, bubbles generated in the composition during the feeding process thereof was removed therefrom by reducing the pressure in the second tank 12' with use of a second vacuum pump 31'.

After the pressure in the second tank 12' was made normal pressure and the tank was sealed, air pressure of 0.02 MPa was charged into the inside of the second tank 12', and a valve provided at the lower portion of the tank 12' was made open, so that the second ultraviolet curing composition 10' was fed to an area between the second cylindrical lens-forming mold 27 and the polycarbonate film 9 nipped by the second rubber roll 8' and the second cylindrical lens-forming mold 27 via a second pipe line 28' and a second nozzle 13' whose temperature were suitably regulated. The second cylindrical lens-forming mold 27 was rotated in the direction of arrow at a circumferential speed of 2.0 m per minute with use of a 0.2 kW geared motor of reduction ratio of 1/200 (manufactured by Mitsubishi Denki Co., Ltd.). With the ultraviolet light from the second ultraviolet light irradiation apparatus 14' was irradiated the second ultraviolet curing composition 10' while being sandwiched between the second lens forming mold 27 and the polycarbonate film 9, so that the second ultraviolet curing composition 10' was polymerized and cured while forming the light incident side lenticular lenses on the other side of the polycarbonate film 9. Then, the ultraviolet curing composition 10' was released from the lens forming mold 27 to thereby obtain a double-sided lenticular lens sheet.

The cross section of the lenticular lens sheet thus obtained was observed by a scanning electron microscope (×2000, JSM-840A, manufactured by Nippon Denshi Co., Ltd.). The height and arrangement pitch of the lenticular lenses were substantially the same as the designed values. A relaxation layer having the thickness of 10 $\mu$m (8% of the lens height) was formed between the polycarbonate film 9 and the light emitting side lenticular lens portion, while another relaxation layer having the thickness of 7 $\mu$m (4% of the lens height) was formed between the polycarbonate film 9 and the light incident side lenticular lens portion, and there was observed substantially no deformation of the lens shapes based on the shrinkage of the ultraviolet curing composition caused by polymerization. The double-sided lenticular lens sheet was mounted on an optical microscope (×40, SMZ-2T, manufactured by Nikon Co., Ltd.). Under the condition that the lens sheet was gradually inclined while being illuminated on the lenticular lens surface, the reflected light was observed through the optical microscope. The optical defect such as glare was not observed in the lenticular lens sheet, so that it was defined as excellent in optical property.

EXAMPLE 5

Figure 21:
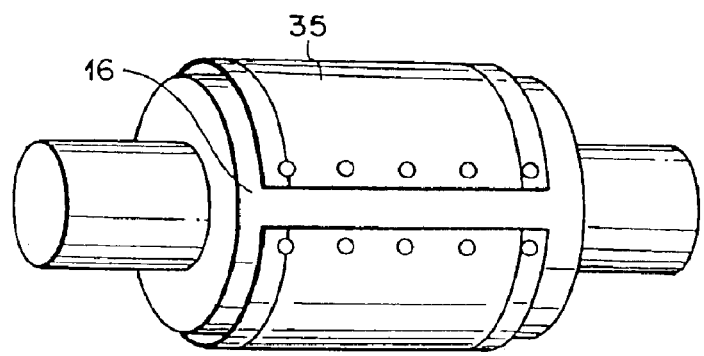
FIG. 21 shows a cylindrical lens-forming mold used in a process of manufacturing a lens sheet according to the present invention.

A double-sided lenticular lens sheet was obtained in the same manner as Example 4 except the following: There was used a first cylindrical lens-forming mold which was constituted by a first thin-plate lens forming mold 35 with step portion, which had a lenticular lens portion transferring pattern and a pair of step portions, as shown in FIG. 21. The step portions having the width of 10 mm were located at both ends of a thin plate made of brass (JIS Brass Type 3) having a thickness of 2.0 mm and a size of 1000 mm×790 mm. The lenticular lens portion transferring pattern was located at an area between the step portions, where the thickness of the thin plate was reduced by 0.03 mm as compared with the step portions. The lenticular lens portion transferring pattern was for use in transfer-forming of a light emitting side lenticular lens portion having the height of 120 $\mu$m and the pitch of 420 $\mu$m. In the same manner, there was used a second cylindrical lens-forming mold which was constituted by a second thin-plate lens forming mold with step portion, which had a lenticular lens portion transferring pattern and a pair of step portions. The lenticular lens portion transferring pattern was for use in transfer-forming of a light incident side lenticular lens portion having the height of 120 $\mu$m and the pitch of 420 $\mu$m. As the transparent substrate was used a polyester film 9 having the thickness of 188 $\mu$m.

The cross section of the lenticular lens sheet thus obtained was observed by a scanning electron microscope (×2000, JSM-840A, manufactured by Nippon Denshi Co., Ltd.). The height and arrangement pitch of the lenticular lenses were substantially the same as the designed values. A relaxation layer having the thickness of 30 $\mu$m (25% of the lens height) was formed between the polyester film 9 and the light emitting side lenticular lens portion, while another relaxation layer having the thickness of 30 $\mu$m (25% of the lens height) was formed between the polyester film 9 and the light incident side lenticular lens portion, and there was observed substantially no deformation of the lens shapes based on the shrinkage of the ultraviolet curing composition caused by polymerization. The double-sided lenticular lens sheet was mounted on an optical microscope (×40, SMZ-2T, manufactured by Nikon Co., Ltd.). Under the condition that the lens sheet was gradually inclined while being illuminated on the lenticular lens surface, the reflected light was observed through the optical microscope. Glare was observed slightly in the lenticular lens sheet, however it was defined as practically usable in optical property.

COMPARATIVE EXAMPLE 1

A prism sheet was obtained in the same manner as Example 1 except that there was used the following ultraviolet curing composition 10 having the viscosity of 15 mPa·S/25° C.:

Phenoxyethylacrylate [Viscoat #192, manufactured by Osaka Yuki Kagaku Kogyo Co., Ltd.] . . . 90 parts by weight Bisphenol A-diepoxy-acrylate [Epoxy ester 3000A, manufactured by Kyoeisha Yushi Kagaku Kogyo Co., Ltd.] . . . 10 parts by weight 2-hydroxy-2-methyl-1-phenyl-propane-1-one [Darocur 1173, manufactured by Ciba-Geigy AG] . . . 1.5 parts by weight The cross section of the prism sheet thus obtained was observed by a scanning electron microscope (×2000, JSM-840A, manufactured by Nippon Denshi Co., Ltd.). There was observed no relaxation layer between the polyester film 9 and the prism portion, and there was observed a slightly concave deformation of the prism surface. The prism sheet was disposed on the light emitting face of the light guide made of acrylic resin via a light diffusing film, so that the prism surface of the prism sheet was at the upper side. A cold cathode lamp was disposed in the neighborhood of a side surface of the light guide, and the other side surfaces and the rear surface were covered with reflection sheet. The cold cathode lamp was turned on to observe the planar light source device. The optical defect of spot patterns was observed in the planar light source device, so that the device was defined as inferior in optical property.

COMPARATIVE EXAMPLE 2

A double-sided lenticular lens sheet was obtained in the same manner as Example 4 except that there was used the following ultraviolet curing compositions 10, 10' having the viscosity of 15 mPa·S/25° C.:

Phenoxyethylacrylate [Viscoat #192, manufactured by Osaka Yuki Kagaku Kogyo Co., Ltd.] . . . 90 parts by weight Bisphenol A-diepoxy-acrylate [Epoxy ester 3000A, manufactured by Kyoeisha Yushi Kagaku Kogyo Co., Ltd.] . . . 10 parts by weight 2-hydroxy-2-methyl-1-phenyl-propane-1-one [Darocur 1173, manufactured by Ciba-Geigy AG] . . . 1.5 parts by weight The cross section of the double-sided lenticular lens sheet thus obtained was observed by a scanning electron microscope (×2000, JSM-840A, manufactured by Nippon Denshi Co., Ltd.). There was observed no relaxation layer between the polycarbonate film 9 and the lenticular lens portion, and there was observed a slight deformation of the surface of the lenticular lens portion. The double-sided lenticular lens sheet was mounted on an optical microscope (×40, SMZ-2T, manufactured by Nikon Co., Ltd.). Under the condition that the lens sheet was gradually inclined while being illuminated on the lenticular lens surface, the reflected light was observed through the optical microscope. The reflected light from a portion of one lenticular lens at one inclination angle, while the reflected light from the corresponding portion of the other lenticular lens at the other inclination angle, whereby occurring the optical defect of glare, so that it was defined as inferior in optical property.

EXAMPLES 6 TO 14, COMPARATIVE EXAMPLE 3 TO 4

Various double-sided prism sheets (single-sided prism sheet only for COMPARATIVE EXAMPLE 3) having the prism portions of refractive index of 1.59 and the size of 243 mm×194 mm were obtained in the same manner as Example 3 except the following: As the ultraviolet curing resin for forming the first and second prism portions, there was used an acrylic ultraviolet curing resin having the refractive index of 1.59 at cured state. The vertical angles of the elongated prisms on the light emitting and light incident sides and the intersecting angles of the directions of the prisms on both sides were set as shown Table 1.

The surface of a metallic plate was subjected to a blast treatment using glass beads of 125 μm to 149 μm (FGB-120, manufactured by Fuji Seisakusho Co., Ltd.) under the condition that the distance between the metallic plate and a blast nozzle was set to 10 cm and the blast pressure was set to 4 Kg/cm$^2$, to thereby obtain a first mold member having a roughened surface. There was provided a mold for forming a light conductor, which is constituted by the above first mold member and a second mold member having a mirror-finished surface on a mettalic plate. A light guide having the thickness of 3 mm and the size of 243 mm×194 mm was obtained by injection molding process of acrylic resin (ACRYPET VH5#000, manufactured by Mitsubishi Rayon Co., Ltd.) with use of the above mold. The average slant angle (θa) of roughened surface of the light guide obtained was 4.2° which was determined according to ISO4287/1-1984.

PET film coated with silver deposited layer was fixed on two short edge surfaces and one of two long edge surfaces by adhesive, and PET film coated with silver deposited layer was applied on the rear surface, which was opposite surface to the roughened surface, with adhesive tape, to form a reflection layer. A cold cathode lamp of straight type having the diameter of 2 mm (NMBSM2BWE253W, manufactured by Harison Co., Ltd.) was disposed near the other of the long edge surfaces of the light guide. The cold cathode lamp and the neighboring long edge surface were covered by PET film coated with silver deposited layer. The prism sheet was disposed on the light emitting face of the light guide so that the light incident side prism surface of the prism sheet confronted the light emitting face of the light guide, to thereby obtain a planar light source device.

A direct current power source was connected to the cold cathode lamp via an inverter (CXA-M10L, manufactured by TDK Co., Ltd.), and DC12V was applied to the cold cathode lamp to turn it on. The planar light source device was mounted on a measuring table so as to be rotated around an axis passing through the center of the planar light source device and extending in parallel to the cold cathode lamp. Then, a black paper having a pinhole of diameter of 4 mm was fixed on the light guide so that the pinhole was positioned at the center of the light guide. A luminance meter (nt-1°, manufactured by Minolta Co., Ltd.) was set at an appropriate position so that the size of measurement circle was 8 mm φ to 9 mm φ. Aging of the cold cathode lamp was conducted over 30 minutes, and then the intensity distribution of the emitted light was measured by the luminance meter while the rotational axis of the measuring table was rorated intermittently at intervals of 5° within the range of 80° to −80° in a plane (horizontal plane) perpendicular to both the light incident face and the light emitting face of the light guide. In the analogous manner, the intensity distribution of the emitted light was measured in a plane (vertical plane) parallel to the light incident face and perpendicular to the light emitting face of the light guide. The measurement results are shown in Table 1. When no prism sheet was disposed on the light guide, the direction of the emitted light of maximum intensity in the horizontal plane was 70° relative to the normal direction of the light emitting face, and the half value width was 25°.

TABLE 1

| EX. NO. | VERTICAL ANGLE OF PRISMS (°) INCIDENT/EMITTING | INTERSECTING ANGLE OF PRISMS (°) | LUMINANCE (Cd/m$^2$) | HALF VALUE WIDTH (°) HORIZONTAL/VERTICAL |
|---|---|---|---|---|
| EX. 6 | 63/130 | 20 | 1450 | 48.5/62.5 |
| EX. 7 | 63/130 | 30 | 1590 | 44.5/62.0 |
| EX. 8 | 63/130 | 40 | 1700 | 41.5/66.5 |
| EX. 9 | 63/140 | 10 | 1700 | 42.0/66.5 |
| EX. 10 | 63/140 | 20 | 1730 | 40.0/68.5 |
| EX. 11 | 63/140 | 25 | 1750 | 39.0/69.0 |
| EX. 12 | 63/113.7 | 45 | 1380 | 50.0/57.0 |
| EX. 13 | 63/113.7 | 50 | 1500 | 47.0/58.5 |
| EX. 14 | 63/113.7 | 60 | 1730 | 39.5/61.5 |
| COM. EX. 3 | 63/— | — | 2300 | 25.5/77.5 |
| COM. EX. 4 | 63/95 | 90 | 2280 | 26.0/57.3 |

INDUSTRIAL APPLICABILITY

The present invention relates to a lens sheet such as a prism sheet used for enhancing luminance in normal direction in a planar light source device for use in liquid crystal display apparatus, etc., a double-sided lenticular lens sheet used in a projection screen for projection television or microfilm reader, etc., and to a method of manufacturing the same. The present invention is suitable for providing the lens sheet having no optical defect such as spot pattern, glare, or the like.

What is claimed is:

1. A prism sheet having a plurality of elongated prisms extending in parallel to each other at both sides, each of the prisms having a substantially triangular cross section, wherein a vertical angle of said prisms at one side is within a range of 50° to 75°, and a vertical angle of said prisms at the other side is within a range of 110° to 160°.

2. The prism sheet as claimed in claim 1, wherein the vertical angle of said prisms at the other side is within a range of 113° to 145°.

3. The prism sheet as claimed in claim 1, wherein said prisms at both sides are formed in such a manner that a first direction of ridges of said prisms at one side differs from a second direction of ridges of said prisms at the other side.

4. The prism sheet as claimed in claim 3, wherein the first direction differs from the second direction by 5° to 60°.

5. The prism sheet as claimed in claim 3, wherein the first direction differs from the second direction by 10° to 50°.

6. The prism sheet as claimed in anyone of claims 1 to 5, wherein the prisms made of activation energy curing resin are extend in parallel to each other on both sides of a transparent substrate.

7. The prism sheet as claimed in claim 6, wherein a relaxation layer is disposed between said transparent substrate and said prisms, and a thickness of said relaxation layer is within a range of 1% to 30% of a height of said prisms.

8. The prism sheet as claimed in claim 7, wherein said relaxation layer is made of activation energy curing resin and formed integrally with said prisms.

9. The prism sheet as claimed in claim 7, wherein the thickness of said relaxation layer is within a range of 3% to 15% of the height of said prisms.

10. The prism sheet as claimed in claim 7, wherein the thickness of said relaxation layer is within a range of 1 µm to 5 µm.

11. A planar light source device comprising:

a light source;

a light guide which has a light incident face on at least one side end surface thereof which confronts said light source, and a light emitting face on one surface thereof which is substantially perpendicular to said light incident face; and the prism sheet as claimed in anyone of claims 1 to 10, which is disposed on said light emitting face of said light guide.

12. The planar light source device as claimed in claim 11, wherein said light guide has a means for causing directive light emission, thereby realizing an emission light intensity distribution within a plane perpendicular to both said light incident face and light emitting face in which a direction of light of maximum intensity is within a range of 50° to 80° relative to a normal line of said light emitting face and a half width is within a range of 10° to 35°.

13. The planar light source device as claimed in claim 11, wherein said prism sheet is disposed so that the one side at which said prisms having the vertical angle of of 50° to 75° are formed confronts said light emitting face of said light guide, and the ridges of said prisms at the one side extend substantially in parallel to said light incident face of said light guide.

14. A liquid cryatal display apparatus comprising:

the planar light source device as claimed in anyone of claims 11 to 13; and a liquid crystal display device disposed so as to confront said light emitting face of the planar light source device.

* * * * *